United States Patent
Zhang et al.

(10) Patent No.: US 12,474,807 B2
(45) Date of Patent: Nov. 18, 2025

(54) TOUCH CONTROL SUBSTRATE, DISPLAY PANEL, AND ELECTRONIC DEVICE

(71) Applicants: Chengdu BOE Optoelectronics Technology Co., Ltd., Sichuan (CN); BOE Technology Group Co., Ltd., Beijing (CN)

(72) Inventors: Shun Zhang, Beijing (CN); Yu Wang, Beijing (CN); Fuqiang Yang, Beijing (CN); Chang Luo, Beijing (CN); Yi Zhang, Beijing (CN); Yang Zeng, Beijing (CN); Tianci Chen, Beijing (CN)

(73) Assignees: Chengdu BOE Optoelectronics Technology Co., Ltd., Chengdu (CN); Beijing BOE Technology Development Co., Ltd., Beijing (CN)

( * ) Notice: Subject to any disclaimer, the term of this patent is extended or adjusted under 35 U.S.C. 154(b) by 10 days.

(21) Appl. No.: 18/029,426

(22) PCT Filed: Mar. 4, 2022

(86) PCT No.: PCT/CN2022/079293
§ 371 (c)(1),
(2) Date: Dec. 4, 2023

(87) PCT Pub. No.: WO2023/273388
PCT Pub. Date: Jan. 5, 2023

(65) Prior Publication Data
US 2024/0012525 A1    Jan. 11, 2024

(30) Foreign Application Priority Data
Jun. 30, 2021   (CN) .......................... 202110736095.3

(51) Int. Cl.
*G06F 3/044* (2006.01)

(52) U.S. Cl.
CPC .......... *G06F 3/0446* (2019.05); *G06F 3/0445* (2019.05); *G06F 2203/04111* (2013.01); *G06F 2203/04112* (2013.01)

(58) Field of Classification Search
CPC ......... G06F 2203/04112; G06F 3/0446; G06F 3/0412; G06F 2203/04111; G06F 3/0443
See application file for complete search history.

(56) References Cited

U.S. PATENT DOCUMENTS

| 2013/0181912 A1 | 7/2013 | Oh |
| 2013/0285939 A1 | 10/2013 | Kim et al. |

(Continued)

FOREIGN PATENT DOCUMENTS

| CN | 104750343 A | 7/2015 |
| CN | 105446570 A | 3/2016 |

(Continued)

OTHER PUBLICATIONS

Jan. 22, 2024—(EP) Extended Search Report—App 22831219.5.
Apr. 11, 2025—(CN) First Office Action—App 202110736095.3 with English Translation.

*Primary Examiner* — Sanjiv D. Patel
(74) *Attorney, Agent, or Firm* — Banner & Witcoff, Ltd.

(57) ABSTRACT

A touch control substrate, a display panel, and an electronic device. The touch control substrate includes a base substrate and first and second touch control electrodes; each second touch control electrode includes second touch control sub-electrodes and second connecting electrodes; the second touch control sub-electrodes are arranged in the first direction, and the second connecting electrode is located between the two adjacent second touch control sub-electrodes; the second touch control sub-electrodes and the second connecting electrodes are located on different conductive layers; the second connecting electrode includes connecting sub-electrodes; two ends of the connecting sub-electrode are con- (Continued)

nected to two adjacent second touch control sub-electrodes; and the connecting sub-electrode includes first and second fold line portions, the fold lines of which are approximately V-shaped, and openings of fold line shapes of the first and second fold line portions are arranged opposite each other in the second direction.

19 Claims, 7 Drawing Sheets

(56) References Cited

U.S. PATENT DOCUMENTS

| | | |
|---|---|---|
| 2016/0370939 A1 | 12/2016 | Guo et al. |
| 2018/0046291 A1 | 2/2018 | Qu |
| 2019/0050104 A1* | 2/2019 | Na ................ G06F 3/0443 |
| 2020/0192525 A1* | 6/2020 | Li ................. G06F 3/0446 |
| 2021/0004094 A1 | 1/2021 | Jeong et al. |
| 2021/0064187 A1* | 3/2021 | Lee ................ G06F 3/0412 |

FOREIGN PATENT DOCUMENTS

| | | |
|---|---|---|
| CN | 107957821 A | 4/2018 |
| CN | 215814106 U | 2/2022 |

* cited by examiner

TOUCH CONTROL SUBSTRATE, DISPLAY PANEL, AND ELECTRONIC DEVICE The application is a U.S. National Phase Entry of International Application PCT/CN2022/079293 filed Mar. 4, 2022, designating the United States of America and claiming priority to Chinese Patent Application No. 202110736095.3, filed Jun. 30, 2021. The present applications claim priority to and the benefit of the above-identified applications and the above-identified applications are incorporated by reference herein in their entirety.

TECHNICAL FIELD

Embodiments of the present disclosure relate to a touch control substrate, a display panel and an electronic device.

BACKGROUND

User interfaces with touch function have been widely used in various electronic devices, for example, may be used in display panels or display devices, etc. A touch structure for implementing the touch function includes a touch control electrode structure. The setting of the touch control electrode structure is an important factor influencing the user experience.

SUMMARY

At least one embodiment of the present disclosure provides a touch control substrate, the touch control substrate comprises a base substrate and a plurality of first touch control electrodes and a plurality of second touch control electrodes, located on the base substrate; the plurality of first touch control electrodes are arranged in a first direction, each of the plurality of first touch control electrodes is extended in a second direction different from the first direction, the plurality of second touch control electrodes are arranged in the second direction and each of the plurality of second touch control electrodes is extended in the first direction; each of the plurality of first touch control electrodes comprises a plurality of first touch control sub-electrodes and at least one first connecting electrode; the plurality of first touch control sub-electrodes are arranged in the second direction; each of at least one first connecting electrode is located between two adjacent first touch control sub-electrodes in the second direction, to electrically connect the two adjacent first touch control sub-electrodes; each of the plurality of second touch control electrodes comprises a plurality of second touch control sub-electrodes and at least one second connecting electrode; the plurality of second touch control sub-electrodes are arranged in the first direction; each of the at least one second connecting electrodes is located between two adjacent second touch control sub-electrodes in the first direction, to electrically connect the two adjacent second touch control sub-electrodes; the plurality of second touch control sub-electrodes and the at least one second connecting electrode are located in different conductive layers relative to the base substrate, respectively; each of the at least one second connecting electrode comprises at least one connecting sub-electrode, and two ends of each of the at least one connecting sub-electrode are connected to the two adjacent second touch control sub-electrodes, respectively, an orthographic projection of each of the at least one connecting sub-electrode on the base substrate overlaps an orthographic projection of one of the plurality of first touch control sub-electrodes on the base substrate; each of the at least one connecting sub-electrode comprises at least one first fold line portion and at least one second fold line portion; a fold line shape of the first fold line portion is an approximate V shape, and a fold line shape of the second fold line portion is an approximate V shape; and an opening of the fold line shape of the first fold line portion and an opening of the fold line shape of the second fold line portion are faced to each other along the second direction.

For example, in the touch control substrate provided by an embodiment of the present disclosure, the first fold line portion and the second fold line portion are arranged in the second direction; a vertex of the fold line shape of the first fold line portion and a vertex of the fold line shape of the second fold line portion are located roughly in a first straight line extending in the second direction.

For example, in the touch control substrate provided by an embodiment of the present disclosure, the opening of the fold line shape of the first fold line portion and the opening of the fold line shape of the second fold line portion are axially symmetrical roughly about a second straight line extending in the first direction.

For example, in the touch control substrate provided by an embodiment of the present disclosure, each of the at least one connecting sub-electrode comprises a first contact portion, a second contact portion and a plurality of connecting portions; the first contact portion and the second contact portion serve as two ends of the connecting sub-electrode, respectively, and are connected to the two adjacent second touch control sub-electrodes; the plurality of connecting portions are located between the first contact portion and the second contact portion and arranged in the second direction, and two ends of each of the plurality of connecting portions are connected to the first contact portion and the second contact portion, respectively; the plurality of connecting portions comprise a first connecting portion and a second connecting portion; and the first connecting portion comprises the first fold line portion, and the second connecting portion comprises the second fold line portion.

For example, in the touch control substrate provided by an embodiment of the present disclosure, each of the at least one connecting sub-electrode comprises a plurality of first fold line portions and a plurality of second fold line portions; the plurality of first fold line portions are arranged in sequence in the first direction and connected in sequence to form the first connecting portion; and the plurality of second fold line portions are arranged in sequence in the first direction and connected in sequence to form the second connecting portion.

For example, in the touch control substrate provided by an embodiment of the present disclosure, the vertices of the plurality of first fold line portions are located roughly in a third straight line extending in the first direction; and the vertices of the plurality of second fold line portions are located roughly in a fourth straight line extending in the first direction.

For example, in the touch control substrate provided by an embodiment of the present disclosure, a center of the first contact portion and a center of the second contact portion are located roughly in a fifth straight line extending in the first direction.

For example, in the touch control substrate provided by an embodiment of the present disclosure, the first contact portion comprises a plurality of first sub-contact portions, and the plurality of first sub-contact portions are spaced apart from one another; the first connecting portion and the second connecting portion are connected to different first sub-contact portions in the first contact portion, respectively, so that the plurality of first sub-contact portions are electrically connected to each other by means of the first connecting portion and the second connecting portion; the second contact portion comprises a plurality of second sub-contact portions and the plurality of second sub-contact portions are spaced apart from one another; and the first connecting portion and the second connecting portion are connected to different second sub-contact portions in the second contact portion, respectively, so that the plurality of second sub-contact portions are electrically connected to each other by means of the first connecting portion and the second connecting portion.

For example, in the touch control substrate provided by an embodiment of the present disclosure, the first connecting portion and the second connecting portion are axially symmetrical roughly about the second straight line extending in the first direction; and centers of the plurality of first sub-contact portions and centers of the plurality of second sub-contact portions are located roughly in the second straight line.

For example, in the touch control substrate provided by an embodiment of the present disclosure, the touch control substrate comprises a first conductive layer, an insulating layer and a second conductive layer located on the base substrate; the insulating layer is located between the first conductive layer and the second conductive layer; the first conductive layer and the second conductive layer are spaced apart and insulated from each other by the insulating layer in a direction perpendicular to the base substrate; the second touch control sub-electrode is located in the first conductive layer, the second connecting electrode is located in the second conductive layer; the first contact portion in the second connecting electrode is connected to the second touch control sub-electrode by means of at least one first through hole penetrating at least through the insulating layer; and the second contact portion in the second connecting electrode is connected to the second touch control sub-electrode by means of at least one second through hole penetrating at least through the insulating layer.

For example, in the touch control substrate provided by an embodiment of the present disclosure, the first contact portion and the second touch control sub-electrode overlap at least partially in the direction perpendicular to the base substrate, to form the at least one first through hole; and the second contact portion and the second touch control sub-electrode overlap at least partially in the direction perpendicular to the base substrate, to form the at least one second through hole.

For example, in the touch control substrate provided by an embodiment of the present disclosure, the first conductive layer is located on a side of the second conductive layer far away from the base substrate.

For example, in the touch control substrate provided by an embodiment of the present disclosure, the first touch control sub-electrode and the first connecting electrode are located in the first conductive layer.

For example, in the touch control substrate provided by an embodiment of the present disclosure, the first touch control electrode and the second touch control electrode comprise a grid structure formed by a plurality of metal grids.

For example, in the touch control substrate provided by an embodiment of the present disclosure, a region defined by orthographic projection of the at least one connecting sub-electrode of the second connecting electrode on the base substrate overlaps at least partially a region defined by an orthographic projection of the first touch control electrode on the base substrate; and the grid structure of the first touch control electrode comprises at least one metal grid located in the overlapping region.

For example, in the touch control substrate provided by an embodiment of the present disclosure, the at least one metal grid comprises one or more closed metal grids.

For example, in the touch control substrate provided by an embodiment of the present disclosure, the first fold line portion of the connecting sub-electrode and the first touch control electrode overlap each other at at least one first position in the direction perpendicular to the base substrate; and the second fold line portion of the connecting sub-electrode and the first touch control electrode overlap each other at at least one second position in the direction perpendicular to the base substrate.

For example, in the touch control substrate provided by an embodiment of the present disclosure, the first fold line portion comprises a first line segment portion and a second line segment portion; one end of the first line segment portion and one end of the second line segment portion are connected to each other to form the approximate V-shaped fold line shape; in the direction perpendicular to the base substrate, the first fold line portion of the connecting sub-electrode and the first touch control electrode overlap each other in a plurality of first positions, the plurality of first positions are located in the first line segment portion and/or the second line segment portion; the second fold line portion comprises a third line segment portion and a fourth line segment portion; one end of the third line segment portion and one end of the fourth line segment portion are connected to each other to form the approximate V-shaped fold line shape; and in the direction perpendicular to the base substrate, the second fold line portion of the connecting sub-electrode and the first touch control electrode overlap each other in a plurality of second positions, and the plurality of second positions are located in the third line segment portion and/or the fourth line segment portion.

For example, in the touch control substrate provided by an embodiment of the present disclosure, the second connecting electrode comprises a plurality of connecting sub-electrodes, and plurality of connecting sub-electrodes are arranged in the second direction; and the plurality of connecting sub-electrodes are connected to the second touch control sub-electrode at different positions of the second touch control sub-electrode, respectively.

For example, in the touch control substrate provided by an embodiment of the present disclosure, the first touch control electrode and the second touch control electrode are insulated from each other; the first touch control electrode is a touch driving electrode, and the second touch control electrode is a touch sensing electrode; or the first touch control electrode is a touch sensing electrode, and the second touch control electrode is a touch driving electrode.

At least one embodiment of the present disclosure provides a display panel, the display panel comprises a display member and the touch control substrate according to any embodiment of the present disclosure, and the display member is stacked with the touch control substrate.

For example, the display panel provided by an embodiment of the present disclosure further comprises an encapsulation layer, and the encapsulation layer is located between the display member and the touch control substrate.

At least one embodiment of the present disclosure provides an electronic device, the electronic device comprising the display panel according to any embodiment of the present disclosure.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

Figure 1:
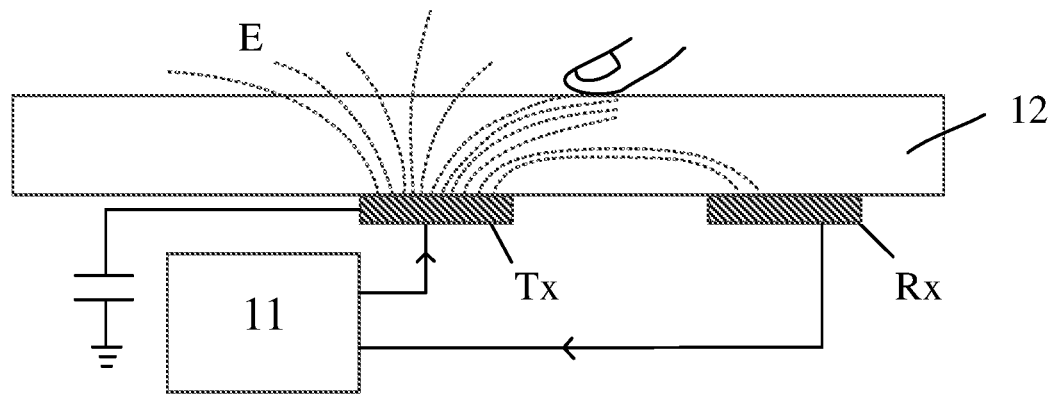
FIG. 1 is a schematic diagram illustrating an operating principle of a mutual capacitive touch structure.

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Unless otherwise defined, all the technical and scientific terms used herein have the same meanings as commonly understood by one of ordinary skill in the art to which the present disclosure belongs. The terms, such as "first," "second," or the like, which are used in the description and the claims of the present disclosure, are not intended to indicate any sequence, amount or importance, but for distinguishing various components. The terms, such as "comprise/comprising," "include/including," or the like are intended to specify that the elements or the objects stated before these terms encompass the elements or the objects and equivalents thereof listed after these terms, but not preclude other elements or objects. The terms, such as "connect/connecting/connected," "couple/coupling/coupled" or the like, are not limited to a physical connection or mechanical connection, but may include an electrical connection/coupling, directly or indirectly. The terms, "on," "under," "left," "right," or the like are only used to indicate relative position relationship, and when the position of the object which is described is changed, the relative position relationship may be changed accordingly.

The drawings in the present disclosure are not drawn strictly according to actual scale, and the numbers of the first touch control electrode, the second touch control electrode, the first touch control sub-electrode, the second touch control sub-electrode, the first connection electrode, the second connection electrode, the connection sub-electrode, and the metal grid in the touch control substrate are not limited to the numbers shown in the drawings, and the specific size and number of each structure may be determined according to actual needs. The drawings described in the present disclosure are only structural schematic diagrams.

An organic light-emitting diode (OLED) display panel has the characteristics of self-luminescence, high contrast, low energy consumption, wide viewing angle, fast response speed, having a capability of being used to a flexibility panel, wide usage temperature range, and simple manufacture, and has broad development prospects. In order to meet the diverse needs of users, it is of great significance to integrate various functions in the display panel, such as touch control function and fingerprint identification function. For example, forming an on-cell touch control structure in an OLED display panel is an implementation mode, which enables the OLED display panel to realize the touch control function by forming the touch control structure on the encapsulation film of the OLED display panel.

For example, a mutual capacitive touch structure includes a plurality of touch control electrodes. The plurality of touch control electrodes include a touch driving electrode Tx and a touch sensing electrode Rx extending in different directions, and a mutual capacitor for touch sensing is formed at the intersecting of the touch driving electrode Tx and the touch sensing electrode Rx. The touch driving electrode Tx is configured to input an excitation signal (for example, a touch driving signal), and the touch sensing electrode Rx is configured to output a touch sensing signal. By inputting the excitation signal to the touch driving electrode, for example, extending longitudinally, the touch sensing signal is received from the touch sensing electrode, for example, extending transversely. Thus, a detection signal capable of reflecting a magnitude of a capacitance value of a coupling point (for example, an intersecting point) of the transverse and longitudinal electrodes can be obtained. When a finger touches a touch screen (for example, a cover glass), the coupling between the touch driving electrode Tx and the touch sensing electrode Rx in the vicinity of the touch point is affected so that the capacitance of the mutual capacitor at the intersecting point between the two electrodes is changed, leading to a change in the touch sensing signal. Coordinates of the touch point may be calculated according to the data of two-dimensional capacitance variation of the touch screen based on a touch sensing signal.

FIG. 1 is a schematic diagram illustrating an operating principle of a mutual capacitive touch structure. As shown in FIG. 1, driven by a touch driving circuit 11, the touch driving electrode Tx is applied with a touch driving signal and thereby generates an electric field line E which is received by the touch sensing electrode Rx to form a reference capacitance. When a finger touches a touch screen 12, since the human body is a conductor, a portion of the electric field line E generated by the touch driving electrode Tx is guided to the finger to form a finger capacitance so that the electric field line E received by the touch sensing electrode Rx is reduced. Therefore, a capacitance value between the touch driving electrode Tx and the touch sensing electrode Rx is reduced. The touch driving circuit 11 obtains the magnitude of the above-mentioned capacitance value by means of the touch sensing electrode Rx, and compares the obtained capacitance value with the reference capacitance to obtain a capacitance value variation. Coordinates of the touch point may be calculated according to the data of the capacitance value variation in combination with position coordinates of each touch capacitor.

However, at the intersecting of the touch driving electrode Tx and the touch sensing electrode Rx, the touch driving electrode Tx and the touch sensing electrode Rx usually need to overlap each other. Hence, the number of film layers at the intersecting may be relatively more than that of film layers in other positions, and electrodes are also arranged relatively densely. As a result, an electrode visualization phenomenon is prone to occur at the intersecting of the touch driving electrode Tx and the touch sensing electrode Rx, producing an adverse effect on the optical performance. For example, after the above-mentioned touch structure and an organic light-emitting diode (OLED) display panel are stacked, it is easy to cause, for example, spot-shaped, line-shaped or block-shaped dark-state etching pattern or mura pattern in a display picture, that is, cause visual poor display in the display picture, producing severe adverse effect on the display effect of the picture.

At least one embodiment of the present disclosure provides a touch control substrate, the touch control substrate includes a base substrate, and a plurality of first touch control electrodes and a plurality of second touch control electrodes located on the base substrate. The plurality of first touch control electrodes are arranged in a first direction, each of the plurality of first touch control electrodes is extended in a second direction different from the first direction, and the plurality of second touch control electrodes are arranged in the second direction, each of the plurality of second touch control electrodes is extended in the first direction. Each of the plurality of first touch control electrodes includes a plurality of first touch control sub-electrodes and at least one first connecting electrode. The plurality of first touch control sub-electrodes are arranged in the second direction. Each first connecting electrode is located between two adjacent first touch control sub-electrodes in the second direction, allowing the two adjacent first touch control sub-electrodes to be electrically connected. Each second touch control electrode includes a plurality of second touch control sub-electrodes and at least one second connecting electrode. The plurality of second touch control sub-electrodes are arranged in the first direction. Each second connecting electrode is located between two adjacent second touch control sub-electrodes in the first direction, allowing the two adjacent second touch control sub-electrodes to be electrically connected. The second touch control sub-electrode and the second connecting electrode are located in different conductive layers relative to the base substrate, respectively. The second connecting electrode includes at least one connecting sub-electrode, and two ends of each connecting sub-electrode are connected to the two adjacent second touch control sub-electrodes, respectively. An orthographic projection of each connecting sub-electrode on the base substrate overlaps an orthographic projection of one of the first touch control sub-electrodes on the base substrate. Each connecting sub-electrode includes at least one first fold line portion and at least one second fold line portion. A fold line shape of the first fold line portion is an approximate V shape, and a fold line shape of the second fold line portion is an approximate V shape. An opening of the fold line shape of the first fold line portion and an opening of the fold line shape of the second fold line portion are opposed to each other in the second direction.

In the touch control substrate provided in the above embodiment of the present disclosure, the openings of the approximate V-shaped fold line shapes of the first fold line portion and the second fold line portion in the connecting sub-electrode are opposed to each other so that the first fold line portion and the second fold line portion are arranged relatively dispersedly between two adjacent second touch control sub-electrodes. Thus, the overlapping regions of the connecting sub-electrode and, for example, other film layers or structures in the touch control substrate are relatively scattered in the direction perpendicular to the base substrate, thereby being conducive to weakening or avoiding the electrode visualization phenomenon and realizing the optimization of the optical performance of the touch control substrate.

For example, the touch control substrate provided in the above embodiment of the present disclosure is applied to a case of, for example, a display panel or a display device including a display member, potential phenomena such as spot-shaped, line-shaped or block-shaped dark-state etching pattern or mura pattern in a display picture occurring in a display picture may also be weakened or avoided, thereby weakening or avoiding potential visual poor display in the display picture and improving the display effect of the picture.

Embodiments of the present disclosure will be described below in detail with reference to the accompanying drawings. It should be noted that like reference numerals in different drawings will be used to designate like elements.

Figure 2:
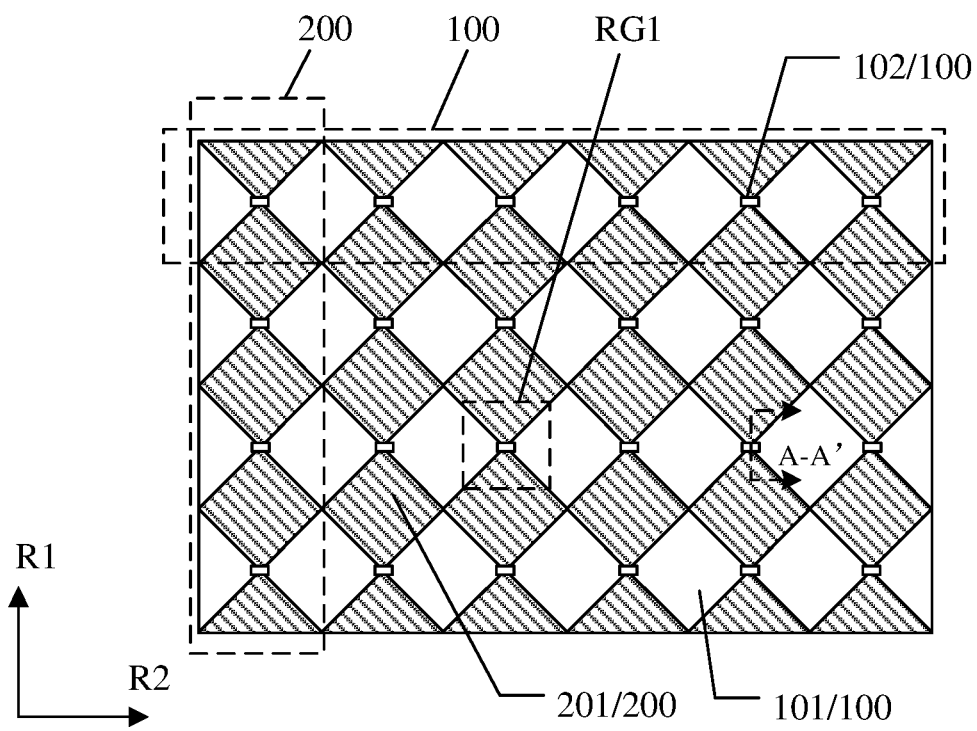
FIG. 2 is a schematic diagram illustrating a partial planar structure of a touch control substrate provided in some embodiments of the present disclosure.
Figure 3:
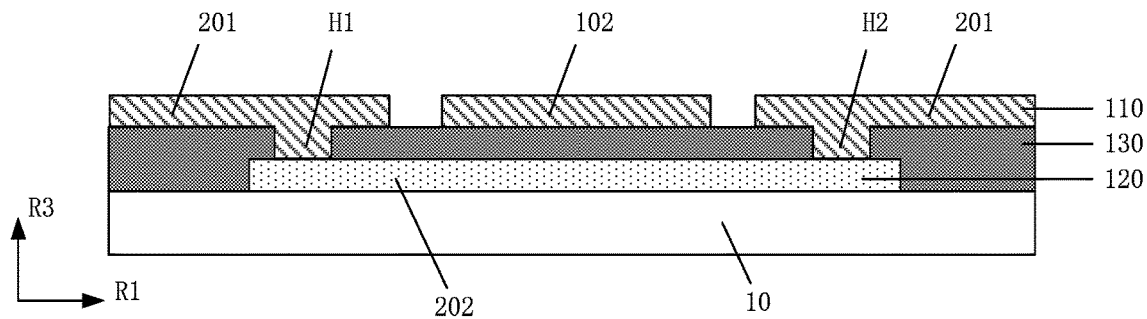
FIG. 3 is a schematic diagram illustrating a partial cross-sectional structure of a touch control substrate provided in some embodiments of the present disclosure.

FIG. 2 is a schematic diagram illustrating a partial planar structure of a touch control substrate provided in some embodiments of the present disclosure, and FIG. 3 is a schematic diagram illustrating a partial cross-sectional structure of a touch control substrate provided in some embodiments of the present disclosure. For example, FIG. 3 is a sectional view taken along line A-A' in FIG. 2.

As shown in FIG. 2 and FIG. 3, the touch control substrate includes a base substrate 10, and a plurality of first touch control electrodes 100 and a plurality of second touch control electrodes 200 located on the base substrate 10. The plurality of first touch control electrodes 100 are arranged in a first direction R1, with each first touch control electrode 100 extending in a second direction R2 different from the first direction R1, and the plurality of second touch control electrodes 200 are arranged in the second direction R2, with each second touch control electrode 200 extending in the first direction R1.

For example, an included angle between the first direction R1 and the second direction R2 may be set in a range of 70° to 90° that includes 70° and 90°. For example, the included angle between the first direction R1 and the second direction R2 may be 70°, 75°, 80°, 85°, or 90°. The specific numerical value of the included angle may be set according to an actual situation, which will not be particularly limited in the embodiments of the present disclosure.

For example, in the touch control substrate provided in the embodiment of the present disclosure, the first direction R1 may be set to be perpendicular to the second direction R2. When the touch control substrate provided in the embodiment of the present disclosure is applied to, for example, a display panel or a display device, the first direction R1 may be a column direction of a subpixel array in the display panel or the display device, and the second direction R2 may be a row direction of the subpixel array in the display panel or the display device. Alternatively, the first direction R1 may be the row direction of the subpixel array in the display panel or the display device, and the second direction R2 may be the column direction of the subpixel array in the display panel or the display device. This will not be limited in the embodiments of the present disclosure.

As shown in FIG. 2 and FIG. 3, each first touch control electrode 100 includes a plurality of first touch control sub-electrodes 101 and a plurality of first connecting electrodes 102. The plurality of first touch control sub-electrodes 101 are arranged in the second direction R2. The first connecting electrode 102 is located between two adjacent first touch control sub-electrodes 101 in the second direction R2, allowing the two adjacent first touch control sub-electrodes 101 to be electrically connected by the first connecting electrode 102. Each second touch control electrode 200 includes a plurality of second touch control sub-electrodes 201 and a plurality of second connecting electrodes 202. The plurality of second touch control sub-electrodes 201 are arranged in the first direction R1. The second connecting electrode 202 is located between two adjacent second touch control sub-electrodes 201 in the first direction R1, allowing the two adjacent second touch control sub-electrodes 201 to be electrically connected by the second connecting electrode 202.

It needs to be noted that the numbers of the first touch control sub-electrodes 101 and the first connecting electrode 102 included in the first touch control electrode 100 and the numbers of the second touch control sub-electrodes 201 and the second connecting electrodes 202 included in the second touch control electrode 200 as shown in FIG. 2 are all illustrated exemplarily, which will not be particularly limited in the embodiments of the present disclosure.

It needs to be noted that main-body profiles of the first touch control sub-electrodes 101 in the first touch control electrode 100 and the second touch control sub-electrodes 201 in the second touch control electrode 200 as shown in FIG. 2 are all rhombus-shaped. However, in some other embodiments of the present disclosure, the first touch control sub-electrode 101 and the second touch control sub-electrode 201 may also be formed into other regular shapes or irregular shapes, such as triangle, rectangle, hexagon, octagon, and strip-shaped, which will not be limited in the embodiments of the present disclosure. For example, the main-body profiles of the first touch control sub-electrodes 101 and the second touch control sub-electrodes 201 may be the same as or different from each other.

The second touch control sub-electrode 201 and the second connecting electrode 202 are located in different conductive layers relative to the base substrate 10, respectively. For example, as shown in FIG. 3, the second touch control sub-electrode 201 is located in the first conductive layer 110 on the base substrate 10, and the second connecting electrode 202 is located in the second conductive layer 120 on the base substrate 10. For example, in some embodiments, the first touch control sub-electrode 101 and the first connecting electrode 102 may be located in the same conductive layer relative to the base substrate 10, for example, as shown in FIG. 3, both are located in the first conductive layer 110, that is, may be located in the same conductive layer with the second touch control sub-electrode 201, and, for example, insulated from the second touch control sub-electrode 201.

In the following embodiments of the present disclosure, the touch control substrate provided in some embodiments of the present disclosure is described specifically by taking a case where, as shown in FIG. 2 and FIG. 3, the first touch control sub-electrode 101, the first connecting electrode 102 and the second touch control sub-electrode 201 are all located in the first conductive layer 110 and the second connecting electrode 202 is located in the second conductive layer 120 as an example. However, it needs to be noted that the embodiments of the present disclosure include but are not limited thereto.

Figure 4A:
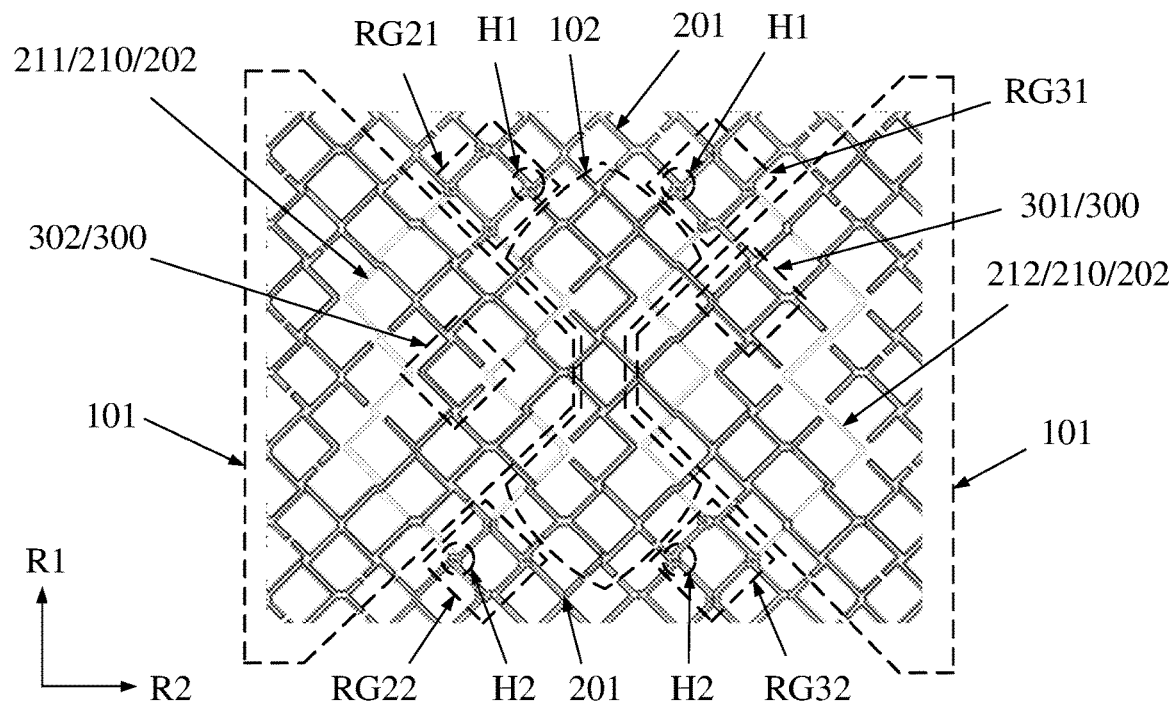
FIG. 4A is a partially enlarged schematic view of an example of a region RG1 shown in FIG. 2.
Figure 4B:
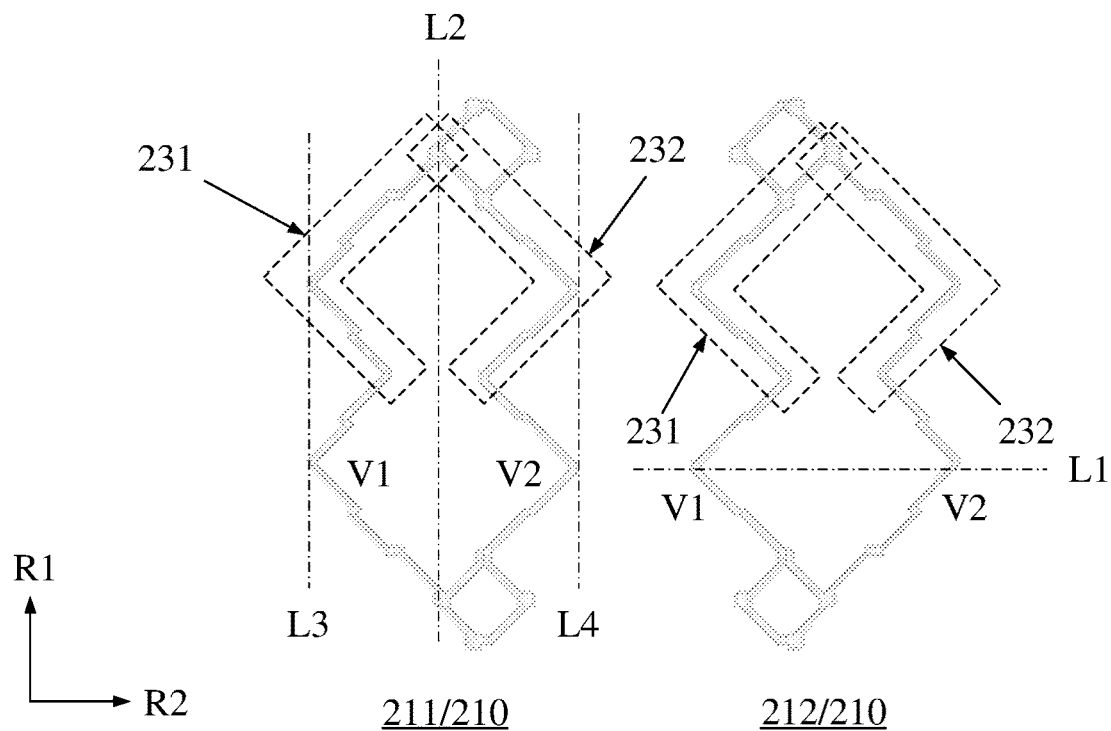
FIG. 4B is a schematic diagram of a connecting sub-electrode shown in FIG. 4A.
Figure 5:
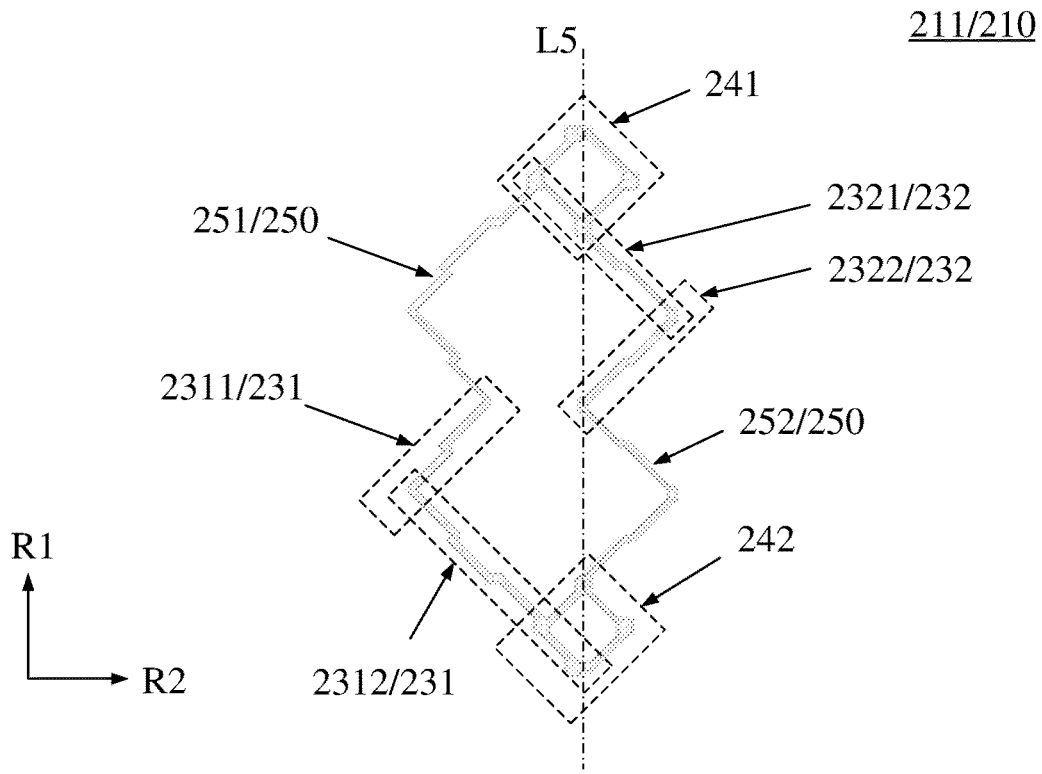
FIG. 5 is a schematic diagram of a connecting sub-electrode provided in some embodiments of the present disclosure.
Figure 6:
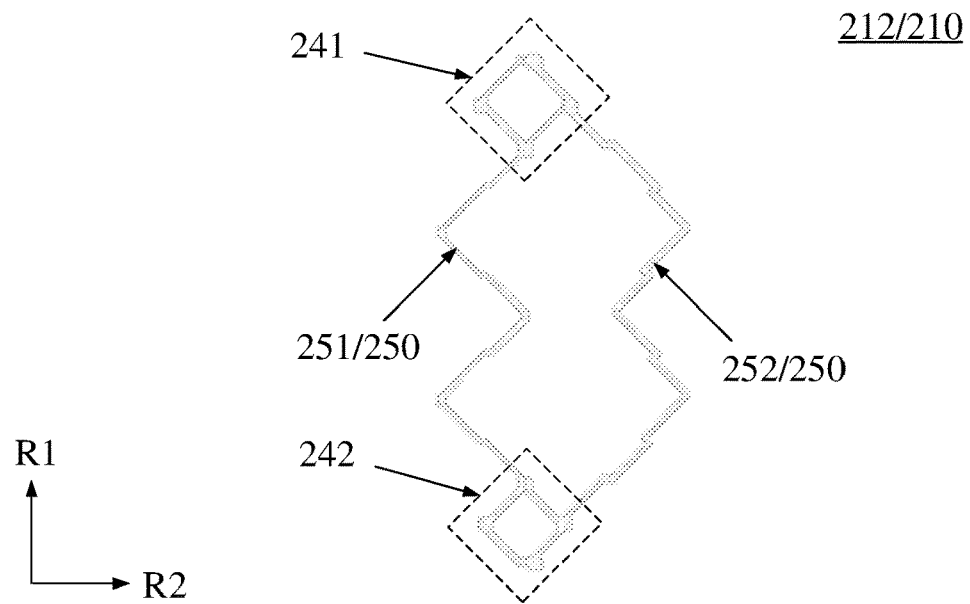
FIG. 6 is a schematic diagram of another connecting sub-electrode provided in some embodiments of the present disclosure.

FIG. 4A is a partially enlarged schematic view of an example of a region RG1 shown in FIG. 2. FIG. 4B is a schematic diagram of a connecting sub-electrode shown in FIG. 4A; for example, FIG. 4B illustrates a structural schematic diagram of a connecting sub-electrode 210 (for example, including a first connecting sub-electrode 211 and a second connecting sub-electrode 212) in FIG. 4A. FIG. 5 is a schematic diagram of a connecting sub-electrode provided in some embodiments of the present disclosure; for example, the connecting sub-electrode shown in FIG. 5 may correspond to the first connecting sub-electrode 211 shown in FIG. 4A and FIG. 4B. FIG. 6 is a schematic diagram of another connecting sub-electrode provided in some embodiments of the present disclosure; for example, the connecting sub-electrode shown in FIG. 6 may correspond to the second connecting sub-electrode 212 shown in FIG. 4A and FIG. 4B.

It needs to be noted that in order to clearly represent the first touch control sub-electrode 101, the first connecting electrode 102 and the second touch control sub-electrode 201 in FIG. 4A, a portion corresponding to the first touch control sub-electrode 101 and the first connecting electrode 102 is roughly illustrated using a dotted box. For example, the dotted box may roughly correspond to a division boundary between the first touch control sub-electrode 101, the first connecting electrode 102 and the second touch control sub-electrode 201. However, it needs to be noted that the dotted box is merely used to represent an approximate position of the first touch control sub-electrode 101 and the first connecting electrode 102, and not used to represent a limitation to the specific edge or boundary line of the first touch control sub-electrode 101 or the first connecting electrode 102.

In some embodiments of the present disclosure, the second connecting electrode 202 includes at least one connecting sub-electrode 210, for example, may include two connecting sub-electrodes 210 as shown in FIG. 4A and FIG. 4B, namely the first connecting sub-electrode 211 and the second connecting sub-electrode 212. Two ends of each connecting sub-electrode 210 are connected to two adjacent second touch control sub-electrodes 201, respectively. For example, with reference to positions RG21 and RG22 shown in FIG. 4A, the first connecting sub-electrode 211 is connected to two adjacent second touch control sub-electrodes 201 respectively, for example, may be connected through through holes H1 and H2, respectively (specifically referring to corresponding content below). With reference to positions RG31 and RG32 shown in FIG. 4A, the second connecting sub-electrode 212 is also connected to the above-mentioned two adjacent second touch control sub-electrodes 201 respectively, for example, may be likewise connected through through holes H1 and H2, respectively.

The orthographic projection of each connecting sub-electrode 210 on the base substrate 10 overlaps the orthographic projection of one first touch control sub-electrode 101 on the base substrate 10. For example, as shown in FIG. 2, FIG. 4A and FIG. 4B, one second connecting electrode 202 is adjacent to two first touch control sub-electrodes 101 respectively in the second direction R2, and the orthographic projection of one connecting sub-electrode 210 (for example, the first connecting sub-electrode 211 or the second connecting sub-electrode 212) included in the second connecting electrode 202 on the base substrate 10 overlaps the orthographic projection of one of the above-mentioned two first touch control sub-electrodes 101 on the base substrate 10. That is, one connecting sub-electrode 210 included in the second connecting electrode 202 and one of the first touch control sub-electrodes 101 adjacent to the second connecting electrode 202 overlap each other in the direction perpendicular to the base substrate 10 (for example, the direction R3 shown in FIG. 3).

For example, in the example shown in FIG. 4A and FIG. 4B, the first connecting sub-electrode 211 in the second connecting electrode 202 and the first touch control sub-electrode 101 located on the left side of the second connecting electrode 202 in the second direction R2 overlap each other in the direction perpendicular to the base substrate 10, and the second connecting sub-electrode 212 in the second connecting electrode 202 and the first touch control sub-electrode 101 located on the right side of the second connecting electrode 202 in the second direction R2 overlap each other in the direction perpendicular to the base substrate 10.

It needs to be noted that in some examples, a portion of the connecting sub-electrodes 210 in the second connecting electrode 202 may overlap, in the direction perpendicular to the base substrate 10, one first touch control sub-electrode 101 adjacent to the second connecting electrode 202 in the second direction R2, and the other portion of the connecting sub-electrodes 210 in the second connecting electrode 202 may not overlap, in the direction perpendicular to the base substrate 10, any one of the above-mentioned first touch control sub-electrodes 101 adjacent to the second connecting electrode 202 in the second direction R2. For example, the connecting sub-electrode 210, relatively close to the first touch control sub-electrode 101 which is adjacent to the second connecting electrode 202, in the second connecting electrode 202 and the first touch control sub-electrode 101 overlap each other in the direction perpendicular to the base substrate 10. Alternatively, in some examples, each connecting sub-electrode 210 in the second connecting electrode 202 may overlap, in the direction perpendicular to the base substrate 10, one first touch control sub-electrode 101 adjacent to the second connecting electrode 202. The embodiments of the present disclosure are not limited thereto.

As shown in FIG. 4A to FIG. 6, each connecting sub-electrode 210 includes at least one first fold line portion 231 and at least one second fold line portion 232. For example, as shown in FIG. 4B, the first connecting sub-electrode 211 (that is, one connecting sub-electrode 210) includes two first fold line portions 231 and two second fold line portions 232, and the second connecting sub-electrode 212 (that is, one connecting sub-electrode 210) includes two first fold line portions 231 and two second fold line portions 232.

It needs to be noted that the embodiments of the present disclosure have no particular limitation on the numbers of the first fold line portions 231 and the second fold line portions 232 included in the connecting sub-electrode 210. For example, the number of the first fold line portions 231 included in the connecting sub-electrode 210 may also be 1, 3, 4 or more, and the number of the second fold line portions 232 included in the connecting sub-electrode 210 may also be 1, 3, 4 or more. For example, the number of the first fold line portions 231 included in one connecting sub-electrode 210 may be the same as or different from the number of the second fold line portions 232 included therein.

As shown in FIG. 4A to FIG. 6, the fold line shape of the first fold line portion 231 is the approximate V shape, and the fold line shape of the second fold line portion 232 is the approximate V shape; and the opening of the fold line shape of the first fold line portion 231 and the opening of the fold line shape of the second fold line portion 232 are faced to each other in second direction R2. For example, the fold line shape of the first fold line portion 231 is open rightwards and the fold line shape of the second fold line portion 232 is open leftwards so that the openings of the fold line shapes of the first fold line portion 231 and the second fold line portion 232 are faced to each other in the second direction R2. Alternatively, it may also be understood as follows: the fold line shape of the first fold line portion 231 protrudes leftwards and the fold line shape of the second fold line portion 232 protrudes rightwards so that the protruding directions of the fold line shapes of the first fold line portion 231 and the second fold line portion 232 are opposed to each other in the second direction R2, and the fold line shape of the first fold line portion 231 protrudes in a direction far away from the second fold line portion 232, and the fold line shape of the second fold line portion 232 protrudes in a direction far away from the first fold line portion 231.

It needs to be noted that the above-mentioned "the fold line shape being the approximate V shape" refers to that the overall profile of the fold line shape is the approximate V shape, and two line segments joined to each other to form the fold line shape may be straight line segments extending linearly, and may also be line segments extending, for example, in the fold line shape, a zigzag shape or other appropriate shapes. In other words, the embodiments of the present disclosure have no limitations on the specific shapes of two line segments forming the first fold line portion 231 and two line segments forming the second fold line portion 232. For example, the edges of the two line segments forming the first fold line portion 231 may be in a shape including a linear shape, a fold line shape, a zigzag shape, a triangle, a waved shape or other appropriate shapes, and the edges of the two line segments forming the second fold line portion 232 may be in a shape including a linear shape, a fold line shape, a zigzag shape, a triangle, a waved shape or other appropriate shapes, which will not be particularly limited in the embodiments of the present disclosure.

In the touch control substrate provided in the above embodiment of the present disclosure, the openings of the approximate V-shaped fold line shapes of the first fold line portion 231 and the second fold line portion 232 in the connecting sub-electrode 210 are faced to each other in the second direction R2. For example, the bending directions or protruding directions of the fold line shapes of the first fold line portion 231 and the second fold line portion 232 are opposite to or faces away from each other in the second direction R2. Thus, the first fold line portion 231 and the second fold line portion 232 are arranged relatively dispersedly between the two adjacent second touch control sub-electrodes 201, and for example, relatively concentrated or dense arrangement of the first fold line portion 231 and the second fold line portion 232 may be weakened or avoided to a certain extent. Thus, the potential overlapping regions of the connecting sub-electrode 210 and, for example, other film layers or structures in the touch control substrate may be relatively scattered correspondingly in the direction perpendicular to the base substrate 10 (for example, the direction R3 shown in FIG. 3), thereby being conducive to weakening or avoiding the electrode visualization phenomenon and realizing the optimization of the optical performance of the touch control substrate.

For example, each connecting sub-electrode 210 is disposed continuously between two adjacent second touch control sub-electrodes 201. In other words, each second connecting electrode 210 remains continuous between two adjacent second touch control sub-electrodes 201 without interruption. For example, the connecting sub-electrode 210 may be disposed integrally between the two adjacent second touch control sub-electrodes 201. For example, the portions of one connecting sub-electrode 210 may be formed from a same material layer using a same preparation process.

For example, in some embodiments, as shown in FIG. 4A to FIG. 6, each connecting sub-electrode 210 (for example, the first connecting sub-electrode 211 and the second connecting sub-electrode 212) includes a plurality of first fold line portions 231 and a plurality of second fold line portions 232, for example, two first fold line portions 231 and two second fold line portions 232. The plurality of first fold line portions 231 are arranged in sequence in the first direction R1 and connected in sequence. For example, two adjacent first fold line portions 231 are connected end to end, that is, the ends, close to each other, of the two adjacent first fold line portions 231 are connected together. The plurality of second fold line portions 232 are arranged in sequence in the first direction R1 and connected in sequence. For example, two adjacent second fold line portions 232 are connected end to end, that is, the ends, close to each other, of the two adjacent second fold line portions 232 are connected together. For example, as shown in FIG. 4A to FIG. 6, the two first fold line portions 231 connected in sequence and the two second fold line portions 232 connected in sequence included in the connecting sub-electrode 210 may form an approximate "8"-shaped structure.

For example, in the embodiments shown in FIG. 4A to FIG. 6, in the connecting sub-electrode 210, for the first fold line portion 231 and the second fold line portion 232 close to the same second touch control sub-electrode 201, an end of the first fold line portion 231 close to the second touch control sub-electrode 201 and an end of the second fold line portion 232 close to the second touch control sub-electrode 201 are connected together so that the formed connecting sub-electrode 210 is disposed continuously between two adjacent second touch control sub-electrodes 201.

It needs to be noted that in some other embodiments of the present disclosure, the end of the first fold line portion 231 close to the second touch control sub-electrode 201 and the end of the second fold line portion 232 close to the second touch control sub-electrode 201 may not be connected to each other. For example, the first fold line portion 231 and the second fold line portion 232 may also be connected by, for example, other wiring structures, which will not be particularly limited in the embodiments of the present disclosure.

For example, in the embodiments shown in FIG. 4A to FIG. 6, the second connecting electrode 202 includes a plurality of connecting sub-electrode 210, that is, includes the first connecting sub-electrode 211 and the second connecting sub-electrode 212. The first connecting sub-electrode 211 and the second connecting sub-electrode 212 are arranged in the second direction R2 and connected to the second touch control sub-electrode 201 at different positions of the second touch control sub-electrode 201, respectively. For example, the first connecting sub-electrode 211 and the second connecting sub-electrode 212 are connected to the second touch control sub-electrode 201 located at the top in FIG. 4A at positions RG21 and RG31 shown in FIG. 4A, respectively, and the first connecting sub-electrode 211 and the second connecting sub-electrode 212 are connected to the second touch control sub-electrode 201 located at the bottom in FIG. 4A at positions RG22 and RG32 shown in FIG. 4A, respectively. Thus, the plurality of connecting sub-electrodes 210 in the second connecting electrode 202 may be arranged relatively dispersed between the above-mentioned two adjacent second touch control sub-electrodes 201 so that the overlapping regions of the connecting sub-electrode 210 and, for example, other film layers or structures in the touch control substrate in the direction perpendicular to the base substrate 10 may also be relatively scattered, thereby being conducive to weakening or avoiding the electrode visualization phenomenon and improving the optical performance of the touch control substrate.

In some embodiments of the present disclosure, as shown in FIG. 4B, the first fold line portion 231 and the second fold line portion 232 are arranged in the second direction R2. The vertex V1 of the fold line shape of the first fold line portion 231 and the vertex V2 of the fold line shape of the second fold line portion 232 are located roughly in the first straight line L1 extending in the second direction R2. Thus, the first fold line portion 231 and the second fold line portion 232 may be distributed relatively uniformly between two adjacent second touch control sub-electrodes 201 so that the overlapping regions of the connecting sub-electrode 210 and, for example, other film layers or structures in the touch control substrate in the direction perpendicular to the base substrate 10 may also be scattered more uniformly; meanwhile, the impedance consistency of the first fold line portion 231 and the second fold line portion 232 may be further improved, improving the signal transmission effect on the connecting sub-electrode 210.

In some embodiments of the present disclosure, as shown in FIG. 4B, the opening of the fold line shape of the first fold line portion 231 and the opening of the fold line shape of the second fold line portion 232 are axially symmetrical roughly about the second straight line L2 extending in the first direction R1. For example, the overall V-shaped profile of the fold line shape of the first fold line portion 231 and the overall V-shaped profile of the fold line shape of the second fold line portion 232 are axially symmetrical roughly about the second straight line L2. Thus, the uniformity of the distribution of the first fold line portion 231 and the second fold line portion 232 between two adjacent second touch control sub-electrodes 201 may be further improved so that the overlapping regions of the connecting sub-electrode 210 and, for example, other film layers or structures in the touch control substrate in the direction perpendicular to the base substrate 10 can also be distributed more uniformly; meanwhile, the impedance consistency of the first fold line portion 231 and the second fold line portion 232 may be further improved, better improving the signal transmission effect on the connecting sub-electrode 210.

Taking the first connecting sub-electrode 211 shown in FIG. 5 as an example, the structure of the connecting sub-electrode 210 is further illustrated below. It needs to be noted that the structure of the second connecting sub-electrode 212 shown in FIG. 6 is substantially similar to that of the first connecting sub-electrode 211 with reference to the corresponding content of the first connecting sub-electrode 211, which will not be described here repeatedly.

For example, as shown in FIG. 4A to FIG. 5, the first connecting sub-electrode 211 includes a first contact portion 241, a second contact portion 242 and a plurality of connecting portions 250. The first contact portion 241 and the second contact portion 242 serve as two ends of the first connecting sub-electrode 211, respectively, and are connected to two adjacent second touch control sub-electrodes 201. The plurality of connecting portions 250 are located between the first contact portion 241 and the second contact portion 242 and arranged in the second direction R2. Two ends of each connecting portion 250 are connected to the first contact portion 241 and the second contact portion 242, respectively. The plurality of connecting portions 250 include a first connecting portion 251 and a second connecting portion 252. The first connecting portion 251 includes the first fold line portion 231, and the second connecting portion 252 includes the second fold line portion 232. In other words, the first fold line portion 231 forms the first connecting portion 251, and the second fold line portion 232 forms the second connecting portion 252.

For example, the two first fold line portions 231 included in the first connecting sub-electrode 211 are arranged in sequence in the first direction R1 and connected in sequence to form the first connecting portion 251. The two second fold line portions 232 included in the first connecting sub-electrode 211 are arranged in sequence in the first direction R1 and connected in sequence to form the second connecting portion 252. Thus, two adjacent second touch control sub-electrodes 201 may be electrically connected by the first contact portion 241, the first connecting portion 251, the second connecting portion 252 and the second contact portion 242.

It needs to be noted that for example, as shown in FIG. 5, each of the first contact portion 241 and the second contact portion 242 may be understood as a portion similar to a bent needle shape formed by connecting three line segments in sequence, or understood as a portion similar to a square profile formed by connecting four line segments in sequence. That is, the second fold line portion 232 and the first contact portion 241 or the second contact portion 242 share a portion of the connecting sub-electrode 210, and this portion may serve as not only the second fold line portion 232 but also the first contact portion 241 or the second contact portion 242.

For example, as shown in FIG. 4A to FIG. 5, the center of the first contact portion 241 and the center of the second contact portion 242 are located roughly in a fifth straight line L5 extending in the first direction R1, thus being conducive to improving the consistency of signal transmission load between two adjacent second touch control sub-electrodes 201 and then improving the signal transmission effect in the second touch control electrode 200.

For example, as shown in FIG. 4A to FIG. 5, the vertices V1 of a plurality of first fold line portions 231 are located roughly in the third straight line L3 extending in the first direction R1 so that the plurality of first fold line portions 231 forming the first connecting portion 251 may be arranged relatively uniformly in the first direction R1, thus improving the consistency of signal transmission load on the first connecting portion 251 and then improving the signal transmission effect of the connecting sub-electrode 210. The vertices V2 of a plurality of second fold line portions 232 are located roughly in the fourth straight line L4 extending in the first direction R1 so that the plurality of second fold line portions 232 forming the second connecting portion 252 may be arranged relatively uniformly in the first direction R1, thus improving the consistency of signal transmission load on the second connecting portion 252 and then improving the signal transmission effect of the connecting sub-electrode 210.

For example, with reference to FIG. 2 to FIG. 6, the touch control substrate includes a first conductive layer 110, an insulating layer 130 and a second conductive layer 120 located on the base substrate 10. The insulating layer 130 is located between the first conductive layer 110 and the second conductive layer 120, and the first conductive layer 110 and the second conductive layer 120 are spaced apart and insulated from each other by the insulating layer 130 in the direction perpendicular to the base substrate 10. The second touch control sub-electrode 201 is located in the first conductive layer 110, the second connecting electrode 202 is located in the second conductive layer 120. The first contact portion 241 is connected to the second touch control sub-electrode 201 by at least one first through hole H1 penetrating at least through the insulating layer 130, for example, 4 first through holes H1 shown in FIG. 4A. The second contact portion 242 is connected to the second touch control sub-electrode 201 by at least one second through hole H2 penetrating at least through the insulating layer 130, for example, 4 second through holes H2 shown in FIG. 4A.

It needs to be noted that the embodiments of the present disclosure have no particular limitation on the numbers of the first through holes H1 and the second through holes H2. For example, in the following embodiments shown in FIG. 9 to FIG. 11, the number of the first through holes H1 and that of the second through holes H2 may each be 5. Alternatively, in some other embodiments of the present disclosure, the number of the first through holes H1 may also be 1, 2, 3, 6 or more, and the number of the second through holes H2 may also be 1, 2, 3, 6 or more, which will not be particularly limited in the embodiments of the present disclosure. It needs to be noted that in the embodiments of the present disclosure, the number of the first through holes H1 may be the same as or different from the number of the second through holes H2.

For example, as shown in FIG. 2 to FIG. 6, the first contact portion 241 in the second connecting electrode 202 overlaps at least partially the second touch control sub-electrode 201 in the direction R3 perpendicular to the base substrate 10 to form the above-mentioned first through hole H1. The second contact portion 242 in the second connecting electrode 202 overlaps at least partially the second touch control sub-electrode 201 in the direction R3 perpendicular to the base substrate 10 to form the above-mentioned second through hole H2.

For example, in the embodiments shown in FIG. 2 to FIG. 6, the first conductive layer 110 is located at a side of the second conductive layer 120 far away from the base substrate 10. Alternatively, in some other embodiments of the present disclosure, the second conductive layer 120 may also be located at a side of the first conductive layer 110 far away from the base substrate 10.

For example, in the embodiments shown in FIG. 2 to FIG. 6, the first conductive layer 110 may be one closer to the user side than the second conductive layer 120. Thus, in a case where the first touch control sub-electrode 101, the first connecting electrode 102 and the second touch control sub-electrode 201 are all located in the first conductive layer 110, the accuracy and sensitivity of signals received on the first touch control electrode 100 and the second touch control electrode 200 from the side of the user can be improved, thereby improving the touch sensitivity of the touch control substrate.

In some embodiments of the present disclosure, as shown in FIG. 2 to FIG. 6, the first touch control sub-electrode 101, the second touch control sub-electrode 201, the first connecting electrode 102 and the second connecting electrode 202 each include a grid structure formed by a plurality of metal grids 300. For example, a metal grid 300 may be a closed metal grid 301 shown in FIG. 4A or an unclosed metal grid 302 shown in FIG. 4A.

It needs to be noted that the pattern (for example, profile, the number, size and shape of the metal grids included) of the grid structure shown in FIG. 4A to FIG. 6 is merely illustrated exemplarily. The embodiments of the present disclosure have no particular limitations on, for example, the number and specific pattern characteristics (such as shape, profile and size) of the metal grids 300 formed in the grid structure.

It needs to be noted that the numbers, shapes, sizes and the like of, for example, the metal grids 300, the closed metal grids 301 and the unclosed metal grids 302 shown in FIG. 4A to FIG. 6 are all illustrated exemplarily, which will not be particularly limited in the embodiments of the present disclosure. For example, the metal grids 300 in the grid structure shown in FIG. 4A to FIG. 6 may all be polygonal, for example, quadrangular. However, in some other embodiments of the present disclosure, the shape of the metal grid 300 may also be other polygons, such as triangle, pentagon and hexagon, which may be particularly designed according to actual requirements. The embodiments of the present disclosure have no limitations on the specific shape, size and the like of the metal grid 300.

Figure 7:
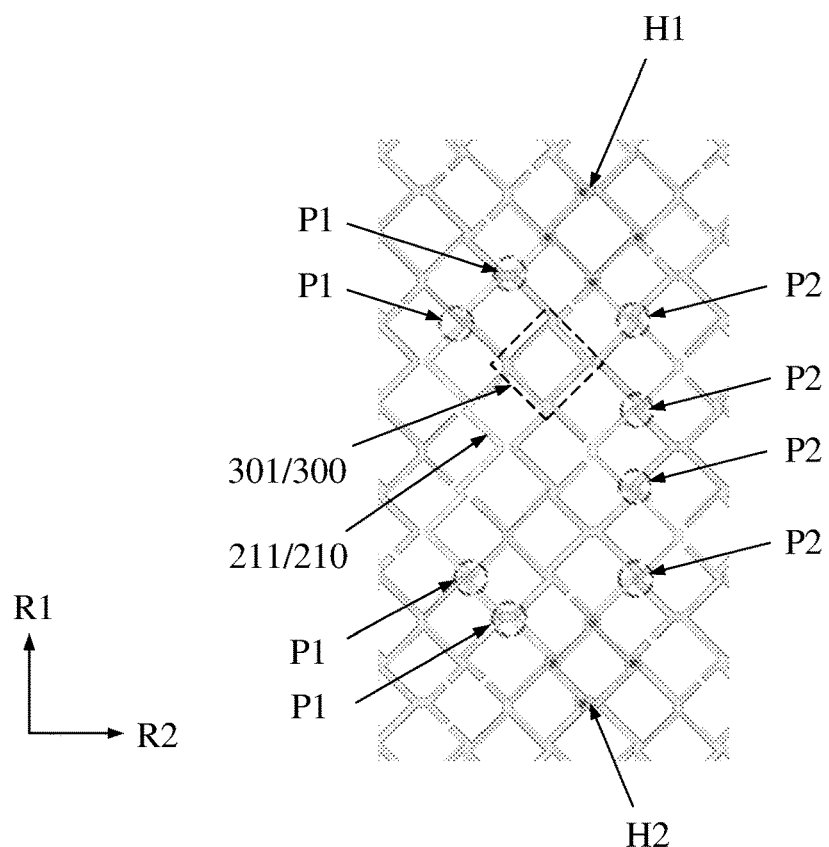
FIG. 7 is a schematic diagram illustrating an overlapping position of a connecting sub-electrode shown in FIG. 5 and a first touch control electrode in a direction perpendicular to a base substrate.
Figure 8:
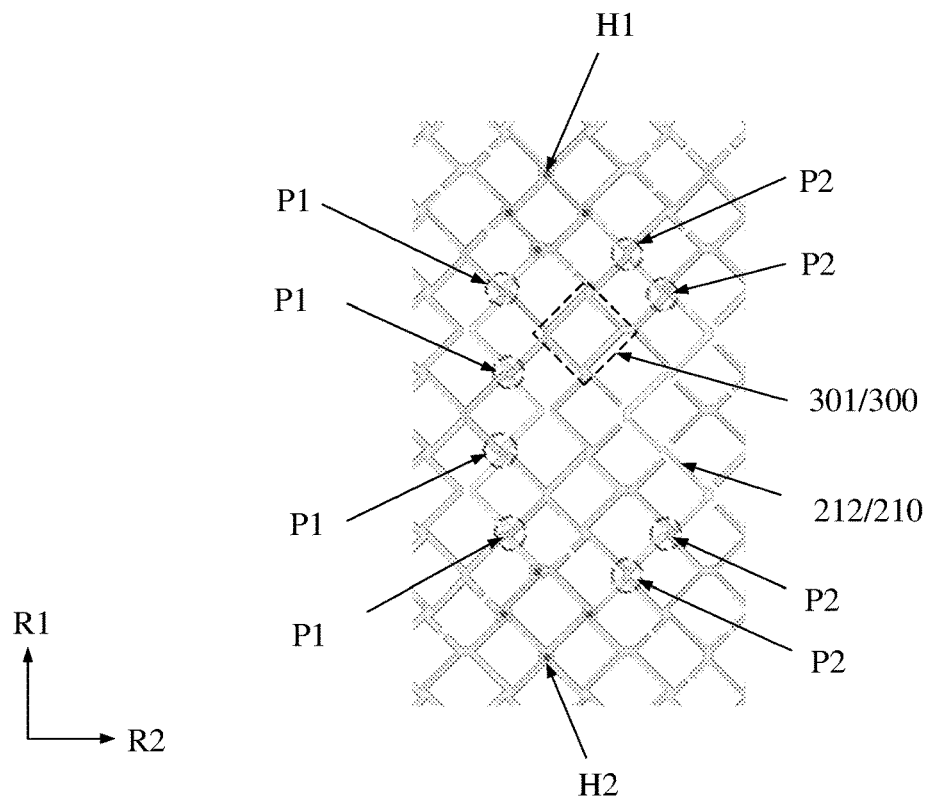
FIG. 8 is a schematic diagram illustrating an overlapping position of a connecting sub-electrode shown in FIG. 6 and a first touch control electrode in a direction perpendicular to a base substrate.

FIG. 7 is a schematic diagram illustrating an overlapping position of a connecting sub-electrode shown in FIG. 5 and a first touch control electrode in a direction perpendicular to a base substrate; and FIG. 8 is a schematic diagram illustrating an overlapping position of a connecting sub-electrode shown in FIG. 6 and a first touch control electrode in a direction perpendicular to a base substrate.

For example, as shown in FIG. 2 to FIG. 8, a region defined by orthographic projections of the connecting sub-electrodes 210 of the second connecting electrode 202 on the base substrate 10 overlaps at least partially a region defined by an orthographic projection of the first touch control electrode 100 on the base substrate 10 so that an overlapping region is included in the direction R3 perpendicular to the base substrate 10 between the connecting sub-electrodes 210 of the second connecting electrode 202 and the first touch control electrode 100, for example, the overlapping region is included in the direction R3 perpendicular to the base substrate 10 between the connecting sub-electrodes 210 of the second connecting electrode 202 and the first connecting electrode 102 of the first touch control electrode 100. The grid structure of the first touch control electrode 100 includes at least one metal grid 300 located in the overlapping region, for example, one or more closed metal grids 301 or unclosed metal grids 302. Thus, the overlapping portions of the connecting sub-electrodes 210 and the first touch control electrode 100 in the direction R3 perpendicular to the base substrate 10 may be relatively scattered, thereby being conducive to weakening or avoiding the electrode visualization phenomenon on the touch control substrate and further improving the optical performance of the touch control substrate.

For example, as shown in FIG. 7 and FIG. 8, the metal grids 300 in the above-mentioned overlapping region include one or more closed metal grids 301. Thus, for example, the signal transmission load on the first connecting electrode 102, configured to connect the first touch control sub-electrode 101, in the first touch control electrode 100 may be reduced, improving the connection effect of the first connecting electrode 102 between two adjacent first contact sub-electrodes 101 and thus being conducive to improving the signal transmission effect on the first touch control electrode 100.

For example, as shown in FIG. 2 to FIG. 8, the first fold line portion 231 of the connecting sub-electrode 210 overlaps the first touch control electrode 100 at one or more first positions P1 in the direction R3 perpendicular to the base substrate 10. The second fold line portion 232 of the connecting sub-electrode 210 overlaps the first touch control electrode 100 at one or more second positions P2 in the direction R3 perpendicular to the base substrate 10.

For example, by taking the first connecting sub-electrode 211 shown in FIG. 7 as an example, the first touch control electrode 100 overlaps the first fold line portion 231 located at the top in the first connecting sub-electrode 211 at two first positions P1, and overlaps the first fold line portion 231 located at the bottom in the first connecting sub-electrode 211 at two first positions P1; and the first touch control electrode 100 overlaps the second fold line portion 232 located at the top in the first connecting sub-electrode 211 at two second positions P2, and overlaps the second fold line portion 232 located at the bottom in the first connecting sub-electrode 211 at two second positions P2.

For example, by taking the second connecting sub-electrode 212 shown in FIG. 8 as an example, the first touch control electrode 100 overlaps the first fold line portion 231 located at the top in the second connecting sub-electrode 212 at two first positions P1, and overlaps the first fold line portion 231 located at the bottom in the second connecting sub-electrode 212 at two first positions P1; and the first touch control electrode 100 overlaps the second fold line portion 232 located at the top in the second connecting sub-electrode 212 at two second positions P2, and overlaps the second fold line portion 232 located at the bottom in the second connecting sub-electrode 212 at two second positions P2.

For example, as shown in FIG. 2 to FIG. 8, the first fold line portion 231 includes a first line segment portion 2311 and a second line segment portion 2312. One end of the first line segment portion 2311 and one end of the second line segment portion 2312 are connected to each other to form the approximate V-shaped fold line shape. In the direction R3 perpendicular to the base substrate 10, the first fold line portion 231 of the connecting sub-electrode 210 overlaps the first touch control electrode 100 at a plurality of first positions P1 that are located in the first line segment portion 2311 and/or the second line segment portion 2312. The second fold line portion 232 includes a third line segment portion 2321 and a fourth line segment portion 2322. One end of the third line segment portion 2321 and one end of the fourth line segment portion 2322 are connected to each other to form the approximate V-shaped fold line shape. In the direction R3 perpendicular to the base substrate 10, the second fold line portion 232 of the connecting sub-electrode 210 overlaps the first touch control electrode 100 at a plurality of second positions P2 that are located in the third line segment portion 2321 and/or the fourth line segment portion 2322.

For example, by taking the first connecting sub-electrode 211 shown in FIG. 7 as an example, the two first positions P1 where the first touch control electrode 100 overlaps the first fold line portion 231 located at the top in the first connecting sub-electrode 211 are both located in the first line segment portion 2311, and the two first positions P1 where the first touch control electrode 100 overlaps the first fold line portion 231 located at the bottom in the first connecting sub-electrode 211 are both located in the second line segment portion 2312. The two second positions P2 where the first touch control electrode 100 overlaps the second fold line portion 232 located at the top in the first connecting sub-electrode 211 are located in the third line segment portion 2321 and the fourth line segment portion 2322, respectively, and the two second positions P2 where the first touch control electrode 100 overlaps the second fold line portion 232 located at the bottom in the first connecting sub-electrode 211 are located in the third line segment portion 2321 and the fourth line segment portion 2322, respectively.

For example, by taking the second connecting sub-electrode 212 shown in FIG. 8 as an example, the two first positions P1 where the first touch control electrode 100 overlaps the first fold line portion 231 located at the top in the second connecting sub-electrode 212 are located in the first line segment portion 2311 and the second line segment portion 2312, respectively, and the two first positions P1 where the first touch control electrode 100 overlaps the first fold line portion 231 located at the bottom in the second connecting sub-electrode 212 are located in the first line segment portion 2311 and the second line segment portion 2312, respectively. The two second positions P2 where the first touch control electrode 100 overlaps the second fold line portion 232 located at the top in the second connecting sub-electrode 212 are both located in the third line segment portion 2321, and the two second positions P2 where the first touch control electrode 100 overlaps the second fold line portion 232 located at the bottom in the second connecting sub-electrode 212 are both located in the fourth line segment portion 2322.

Figure 9:
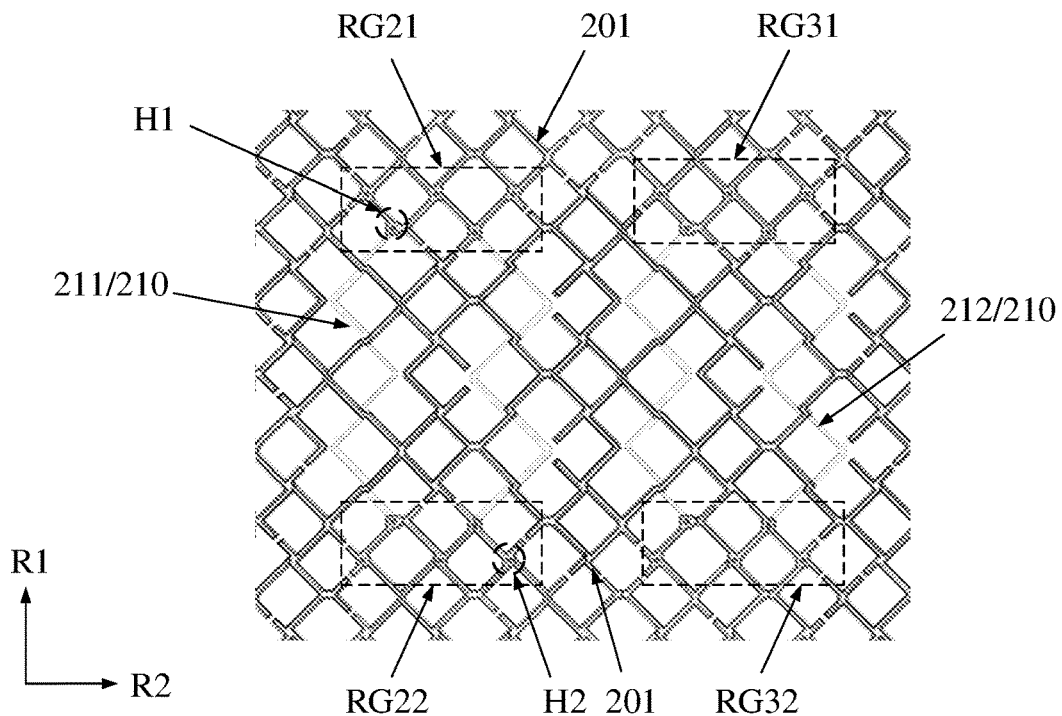
FIG. 9 is a partially enlarged schematic view of another example of a region RG1 shown in FIG. 2.
Figure 10:
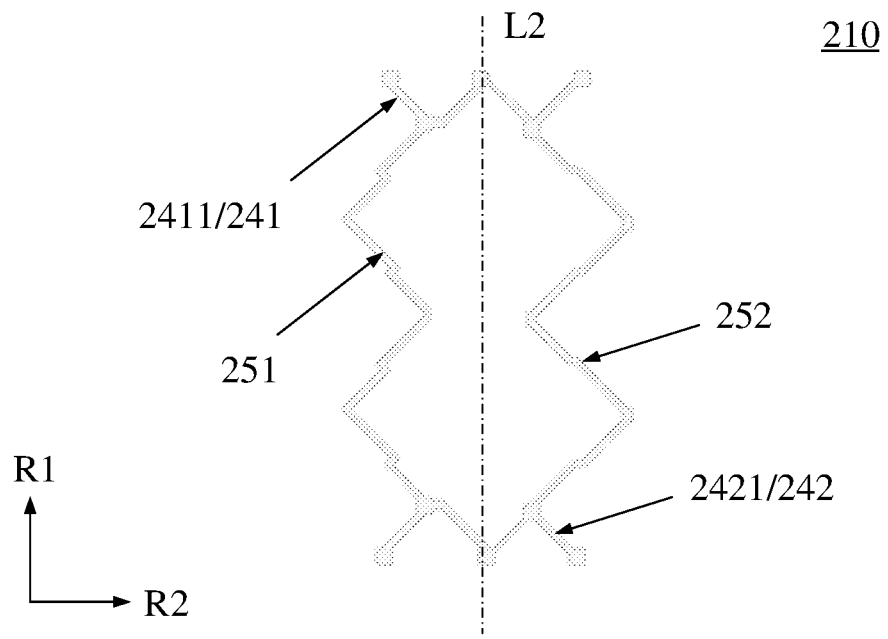
FIG. 10 is a schematic diagram of a further another connecting sub-electrode provided in some embodiments of the present disclosure.
Figure 11:
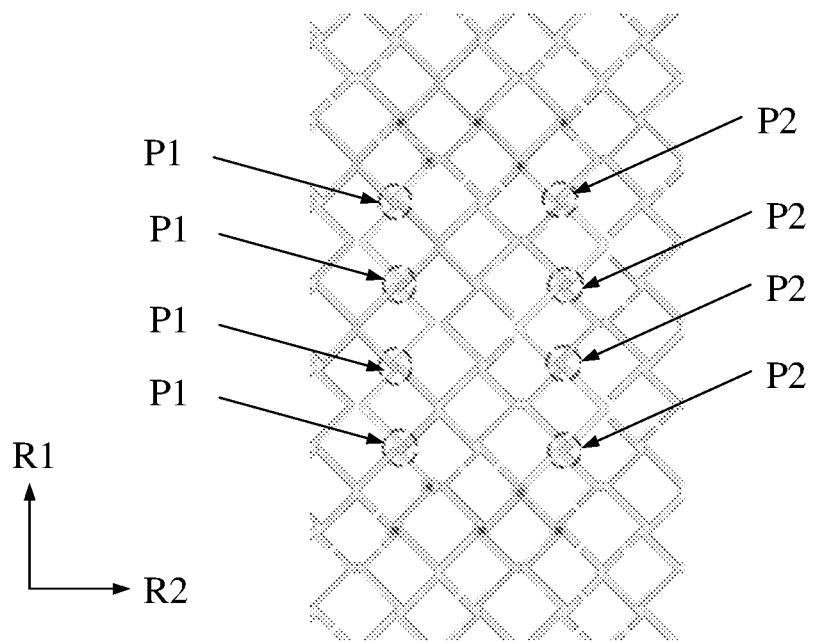
FIG. 11 is a schematic diagram illustrating an overlapping position of a connecting sub-electrode shown in FIG. 10 and a first touch control electrode in a direction perpendicular to a base substrate.

FIG. 9 is a partially enlarged schematic view of another example of a region RG1 shown in FIG. 2. FIG. 10 is a schematic diagram of a further another connecting sub-electrode provided in some embodiments of the present disclosure; for example, the connecting sub-electrode shown in FIG. 10 may correspond to the connecting sub-electrode 210 (for example, the first connecting sub-electrode 211 or the second connecting sub-electrode 212) shown in FIG. 9. FIG. 11 is a schematic diagram illustrating an overlapping position of a connecting sub-electrode shown in FIG. 10 and a first touch control electrode in a direction perpendicular to a base substrate. It needs to be noted that except the first contact portion 241 and the second contact portion 242 in the connecting sub-electrode 210, the connecting sub-electrode 210 shown in FIG. 9 to FIG. 11 is substantially the same as or similar to the connecting sub-electrode 210 shown in FIG. 4A to FIG. 81 in structure and function, and the repeated content will not be described here redundantly.

In some embodiments of the present disclosure, as shown in FIG. 9 to FIG. 11, the first contact portion 241 includes a plurality of first sub-contact portion 2411 that are spaced apart from one another. For example, the plurality of first sub-contact portion 2411 may be arranged at intervals in the second direction R2. The first connecting portion 251 and the second connecting portion 252 of the connecting sub-electrode 210 are connected to different first sub-contact portion 2411 in the first contact portion 241, respectively, so that the plurality of first sub-contact portion 2411 are electrically connected to one another by means of the first connecting portion 251 and the second connecting portion 252. The second contact portion 242 includes a plurality of second sub-contact portions 2421 that are spaced apart from one another. For example, the plurality of second sub-contact portions 2421 may be arranged at intervals in the second direction R2. The first connecting portion 251 and the second connecting portion 252 are connected to different second sub-contact portions 2421 in the second contact portion 242, respectively, so that the plurality of second sub-contact portions 2421 are electrically connected to one another by means of the first connecting portion 251 and the second connecting portion 252.

It needs to be noted that for example, as shown in FIG. 10, each of the first contact portion 241 and the second contact portion 242 may also be overall understood as a portion similar to a "W" shape formed by connecting five line segments in sequence. That is, the first connecting portion 251 and the second connecting portion 252 share a portion of the connecting sub-electrode 210 with the first contact portion 241, and share a portion of the connecting sub-electrode 210 with the second contact portion 242.

For example, in the embodiments shown in FIG. 9 to FIG. 11, compared with the above embodiments shown in FIG. 4A to FIG. 8, the second touch control sub-electrode 201 may be electrically connected to the connecting sub-electrode 210 through more (for example, 5 shown in FIG. 9) first through holes H1 at positions RG21 and RG31, respectively, and through more (for example, 5 shown in FIG. 9) second through holes H2 at positions RG22 and RG32, respectively, thus further improving the stability of the electrical connection between the second touch control sub-electrode 201 and the connecting sub-electrode 210.

For example, the first connecting portion 251 and the second connecting portion 252 are axially symmetrical roughly about the second straight line L2 extending in the first direction R1. The centers of the plurality of first first sub-contact portion 2411 and the centers of the plurality of second sub-contact portions 2421 are located roughly in the second straight line L2. That is, the center of the first contact portion 241 and the center of the second contact portion 242 are located roughly in the second straight line L2. Thus, it is conducive to improving the stability and the consistency of signal transmission load between two adjacent second touch control sub-electrodes 201, and then the signal transmission effect in the second touch control electrode 200 can be improved.

For example, in the embodiments shown in FIG. 9 to FIG. 11, four first positions P1 where the first touch control electrode 100 overlaps the first fold line portion in the connecting sub-electrode 210 are distributed roughly uniformly in the first direction R1, and four second positions P2 where the first touch control electrode 100 overlaps the second fold line portion in the connecting sub-electrode 210 are distributed roughly uniformly in the first direction R1. Thus, the overlapping positions of the connecting sub-electrode 210 and the first touch control electrode 100 in the direction R3 perpendicular to the base substrate 10 are distributed relatively more uniformly, thus being more conducive to weakening or avoiding the electrode visualization phenomenon and better realizing the optimization of the optical performance of the touch control substrate.

In some embodiments of the present disclosure, the metal grids in the grid structures of the first touch control electrode 100 and the second touch control electrode 200 may be made of a material including metal materials such as aluminum, molybdenum, copper and silver or an alloy material of such metal materials, for example, a silver-palladium-copper (APC) alloy material.

For example, the insulating layer 130 may be made of an inorganic insulating material. For example, the inorganic insulating material is a transparent material. For example, the inorganic insulating material is a metal oxynitride insulating material including oxide of silicon, nitride of silicon or oxynitride of silicon such as silicon oxide, silicon nitride and silicon oxynitride, or aluminium oxide, titanium nitride, or the like.

For example, the insulating layer 130 may be made of an organic insulating material to obtain good bending resistance. For example, the organic insulating material is a transparent material. For example, the organic insulating material is an optical clear adhesive (OCA). For example, the organic insulating material may include polyimide (PI), acrylate, epoxy resin, polymethyl methacrylate (PMMA), etc.

It needs to be noted that in some other embodiments, two adjacent first touch control sub-electrodes 101 in the second direction R2 may also be connected by a bridging structure, while two second touch control sub-electrodes 201 in the first direction R1 may be connected by, for example, a connecting electrode which is located in the same layer and integrally formed with the second touch control sub-electrode 201. That is, the electrical connection manner used between the two adjacent first touch control sub-electrodes 101 in the second direction R2 may be interchangeable with that used between the two adjacent second touch control sub-electrodes 201 in the first direction R1.

In some embodiments of the present disclosure, the first touch control electrode 100 and the second touch control electrode 200 may be insulated from each other. The first touch control electrode 100 may be a touch driving electrode and the second touch control electrode 200 may be a touch sensing electrode; alternatively, the first touch control electrode 100 may be a touch sensing electrode and the second touch control electrode 200 may be a touch driving electrode. This will not be limited in the embodiments of the present disclosure.

For example, when the touch control substrate described above is applied to, for example, a display panel or a display device, each first touch control electrode 100 and each second touch control electrode 200 may be each electrically connected to one signal line and connected to a touch controller or a touch integrated circuit by means of the signal line. By taking a case that the first touch control electrode 100 is the touch sensing electrode and the second touch control electrode 200 is the touch driving electrode as an example, the touch integrated circuit may be, for example, a touch chip configured to provide a touch driving signal to the second touch control electrode 200, receive a touch sensing signal from the first touch control electrode 100 and process the received touch sensing signal, for example, provide the processed data/signal to a system controller to realize the touch sensing function. For example, one end, connected to the touch integrated circuit, of a signal line may be arranged on the same side of the touch region of the display panel to facilitate connection with the touch integrated circuit. Alternatively, one signal line may be disposed at each of two ends of one second touch control electrode 200. When operating, the touch integrated circuit inputs touch driving signals in two directions (both-side driving) to one second touch control electrode 200 through two signal lines, so that the signal loading speed on the second touch control electrode 200 is increased. As a result, the detection speed can be increased.

In the touch control substrate provided in the embodiments of the present disclosure, since the first touch control sub-electrode 101 and the second touch control sub-electrode 201 both have a shape similar to rhombus and an included angle between the extension direction of each side of the rhombus (for example, the extension direction of each edge of the first touch control sub-electrode 101 and the second touch control sub-electrode 201) and the first direction R1 or the second direction R2 ranges from 20° to 25°, the edges of each first touch control sub-electrode 101 and each second touch control sub-electrode 201 may have an included angle of 20° to 25° with, for example, the row direction or the column direction of a subpixel array in a display panel or a display device. Thus, the potential interference between the first touch control sub-electrode 101 and the second touch control sub-electrode 201 and the subpixel array can be reduced or avoided, reducing or avoiding the generation of, for example, the mura pattern phenomenon.

At least one embodiment of the present disclosure further provides a display panel that includes a display member and the touch control substrate described in any embodiment of the present disclosure. In the display panel, the display member and the touch control substrate are stacked.

Figure 12:
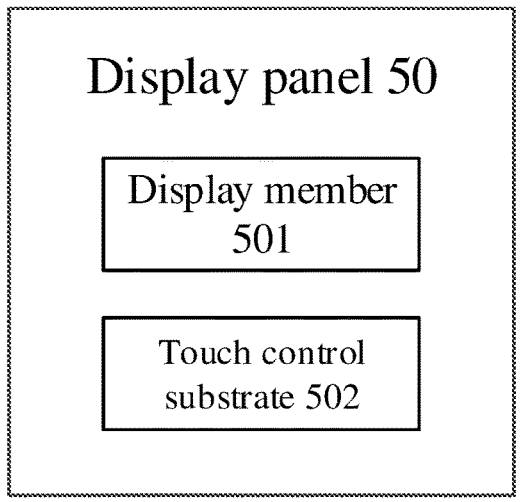
FIG. 12 is a schematic block diagram of a display panel provided in some embodiments of the present disclosure.

FIG. 12 is a schematic block diagram of a display panel provided in some embodiments of the present disclosure. For example, as shown in FIG. 12, the display panel 50 includes a display member 501 and a touch control substrate 502. For example, the display member 501 and the touch control substrate 502 may be stacked. For example, the touch control substrate 502 may be the touch control substrate described in any embodiment of the present disclosure.

For example, in some embodiments of the present disclosure, the display panel may also include an encapsulation layer located between the display member 501 and the touch control substrate 502, thereby avoiding potential mutual interference between the display member 501 and, for example, a functional structure or a film material in the touch control substrate 502.

Figure 13:
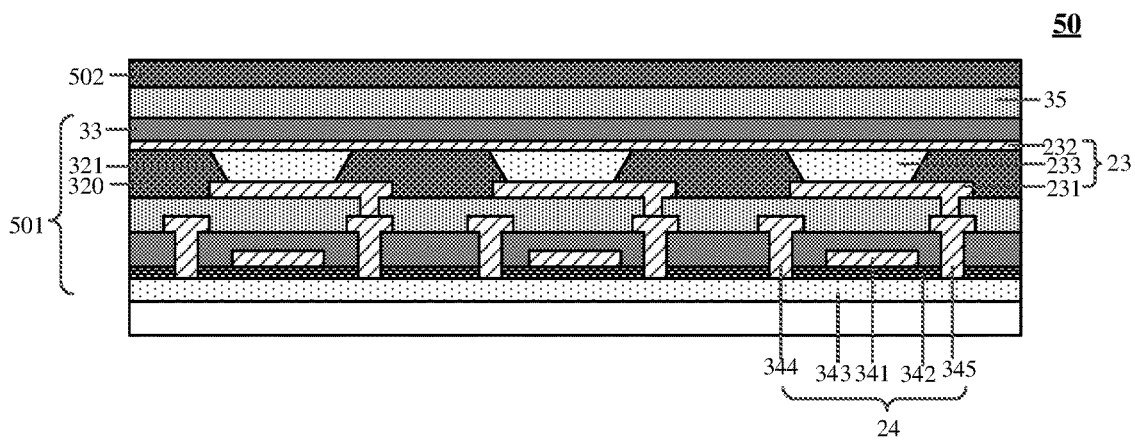
FIG. 13 is a structural schematic diagram of a specific example of a display panel provided in some embodiments of the present disclosure.

FIG. 13 is a structural schematic diagram of a specific example of a display panel provided in some embodiments of the present disclosure.

As shown in FIG. 13, the touch control substrate 502 is located on a display side of the display member 501, for example, a side closer to a user during use.

For example, the embodiment is illustrated by taking a case that the display panel is an OLED display panel as an example. For example, the OLED display panel may be an on-cell or in-cell touch control display panel. As a matter of course, in some other embodiments, the display panel may also be a liquid crystal display panel. The embodiments of the present disclosure have no limitation on the specific type of the display panel using the touch control substrate provided in the embodiments of the present disclosure.

For example, the display member 501 includes a plurality of subpixels arranged in an array. For example, the display panel 50 is an OLED display panel, and the plurality of subpixels may include a green subpixel, a red subpixel, a blue subpixel or the like. Each subpixel includes a light-emitting element 23 and a pixel driving circuit for driving the light-emitting element 23 to emit light. The embodiments of the present disclosure have no limitations on the type and specific components of the pixel driving circuit. For example, the pixel driving circuit may be of a current-driven type or a voltage-driven type, and may be a 2T1C (that is, two transistors and one capacitor, the two transistors including a driving transistor and a data writing transistor) driving circuit, or may be a driving circuit further including a compensating circuit (a compensating transistor), a light-emitting control circuit (a light-emitting control transistor), a reset circuit (a reset transistor) and the like on the basis of 2T1C.

For the sake of clarity, FIG. 13 illustrates a first transistor 24, which is electrically connected directly to the light-emitting element 23, in the pixel driving circuit. The first transistor 24 may be a driving transistor and configured to operate in a saturated state and control the magnitude of the current that drives the light-emitting element 23 to emit light. For example, the first transistor 24 may also be a light-emitting control transistor for controlling whether a current for driving the light-emitting element 23 to emit light flows therethrough. The embodiments of the present disclosure have no limitation on the specific type of the first transistor.

For example, the light-emitting element 23 is an organic light-emitting diode including a first electrode 231, a light-emitting layer 233 and a second electrode 232. One of the first electrode 231 and the second electrode 232 is an anode, while the other one is a cathode. For example, the first electrode 231 is an anode, while the second electrode 232 is a cathode. For example, the light-emitting layer 233 is an organic light-emitting layer or a quantum-dot light-emitting layer. For example, in addition to the light-emitting layer 233, the light-emitting element 23 may also include auxiliary functional layers such as a hole injection layer, a hole transport layer, an electron injection layer and an electron transport layer. For example, the light-emitting element 23 may be a top-emitting structure. The first electrode 231 is reflective while the second electrode 232 is transmissive or semi-transmissive. For example, the first electrode 231 is made of a high-work-function material, for example, an ITO/Ag/ITO stacked structure, to serve as an anode. The second electrode 232 is made of a low-work-function material, for example, a semi-transmissive metal or metal alloy material (for example, an Ag/Mg alloy material), to serve as a cathode.

The first transistor 24 includes a gate 341, a gate insulating layer 342, an active layer 343, a first pole 344 and a second pole 345. The second pole 345 is electrically connected to the first electrode 231 of the light-emitting element 23. The embodiments of the present disclosure have no limitations on the type, material, structure and the like of the first transistor 24. For example, the first transistor may be of a top gate type, a bottom gate type, etc. For example, an active layer 343 of the first transistor 24 may be made of amorphous silicon, polycrystalline silicon (low-temperature polycrystalline silicon and high-temperature polycrystalline silicon), oxide semiconductor (for example, indium gallium tin oxide (IGZO)), etc. For example, the first transistor 24 may be an N type transistor or a P type transistor.

All the transistors (for example, the first transistor 24) used in the embodiments of the present disclosure may be thin film transistors or field effect transistors or other switching members having the same characteristics. The thin film transistor is described as an example in the embodiments of the present disclosure. The source and the drain of a transistor used herein may be structurally symmetrical and thus may be structurally indistinguishable. In an embodiment of the present disclosure, to distinguish between two poles except the gate of the transistor, one pole is directly described as the first pole, while the other pole is as the second pole.

As shown in FIG. 13, the display member 501 further includes a pixel defining layer 320. The pixel defining layer 320 is disposed on the first electrodes 231 of the light-emitting element 23 and has a plurality of openings 321 formed therein to expose the first electrodes 231 of a plurality of subpixels, respectively, thereby defining a pixel opening region of each subpixel. The light-emitting layer of the subpixel is formed in the pixel opening region, and the second electrode 232 is formed as a common electrode (that is, shared by a plurality of subpixels).

As shown in FIG. 13, the display device 501 further includes an encapsulation layer 33 located between the light-emitting element 23 and the touch control substrate 502. The encapsulation layer 33 is configured to seal the light-emitting element 23 to prevent damage of devices such as the light-emitting element 23 caused by the infiltration of external moisture and oxygen into the light-emitting element 23 and the driving circuit. For example, the encapsulation layer 33 may be a single-layer structure or a multi-layer structure, for example, a multi-layer structure including an organic thin film and an inorganic thin film or including alternately stacked organic thin films and inorganic thin films.

For example, as shown in FIG. 13, the display panel 50 further includes a buffer layer 35 located between the display member 501 and the touch control substrate 502. For example, the buffer layer 35 is formed on the encapsulation layer 33 to improve the adhesion force between the touch control substrate 502 and the display device 501. For example, the buffer layer 35 may be an inorganic insulating layer. For example, the buffer layer 35 may be made of silicon nitride, silicon oxide, a silicon oxynitride, or the like. For example, the buffer layer 35 may also include a structure of alternatively stacked silicon oxide layers and silicon nitride layers.

The display panel 50 provided in the embodiment of the present disclosure has both the touch function and the display function, and has all the technical effects of the touch control substrate provided in the above embodiments of the present disclosure, which will not be described here redundantly.

At least one embodiment of the present disclosure further provides an electronic device that includes a display panel described in any embodiment of the present disclosure, for example, may include the display panel 50 described above.

Figure 14:
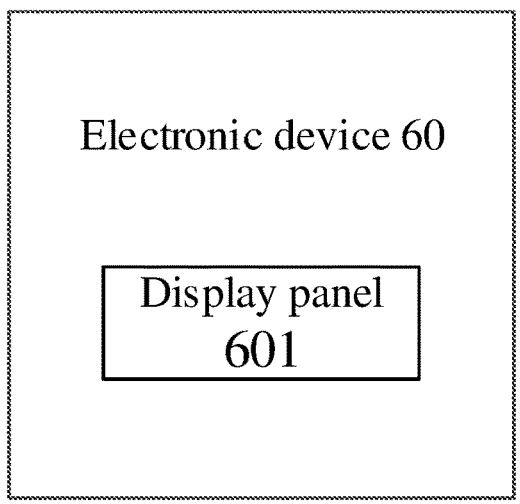
FIG. 14 is a schematic block diagram of an electronic device provided in some embodiments of the present disclosure.

FIG. 14 is a schematic block diagram of an electronic device provided in some embodiments of the present disclosure. For example, as shown in FIG. 14, the electronic device includes a display panel 601. For example, the display panel 601 may be the display panel described in any embodiment of the present disclosure, for example, the display panel 50 in the above embodiment.

For example, the electronic device may be a display apparatus or display device having the display function and the touch function, for example, an OLED display device, an QLED display device or a liquid crystal display device.

For example, the electronic device may be any product or component having the display function and the touch function, such as a display, an OLED panel, an OLED television, a liquid crystal display panel, a liquid crystal display television, a QLED panel, a QLED television, an electronic paper, a mobile phone, a tablet computer, a notebook computer, a digital photo frame and a navigator.

The following statements should be noted:

(1) The accompanying drawings involve only the structure(s) in connection with the embodiment(s) of the present disclosure, and other structure(s) may be referred to common design(s).

(2) For the purpose of clarity only, in accompanying drawings for illustrating the embodiment(s) of the present disclosure, the thickness and size of a layer or a structure may be enlarged, that is, the accompanying drawings are not drawn according to the actual scale. However, it should understood that, in the case in which a component or element such as a layer, film, region, substrate or the like is referred to be "on" or "under" another component or element, it may be directly on or under the another component or element, or a component or element is interposed therebetween.

(2) For the purpose of clarity only, in accompanying drawings for illustrating the embodiment(s) of the present disclosure, the thickness and size of a layer or a region may be enlarged or reduced, that is, the accompanying drawings are not drawn according to the actual scale.

(3) In case of no conflict, features in one embodiment or in different embodiments can be combined to obtain a new embodiment.

What are described above is related to the specific embodiments of the disclosure only and not limitative to the protection scope of the disclosure. The protection scope of the disclosure shall be based on the protection scope of the claims.

The invention claimed is:

1. A touch control substrate, comprising:

a base substrate; and a plurality of first touch control electrodes and a plurality of second touch control electrodes, located on the base substrate, wherein the plurality of first touch control electrodes are arranged in a first direction, each of the plurality of first touch control electrodes is extended in a second direction different from the first direction, the plurality of second touch control electrodes are arranged in the second direction and each of the plurality of second touch control electrodes is extended in the first direction;

each of the plurality of first touch control electrodes comprises a plurality of first touch control sub-electrodes and at least one first connecting electrode; the plurality of first touch control sub-electrodes are arranged in the second direction; each of at least one first connecting electrode is located between two adjacent first touch control sub-electrodes in the second direction, to electrically connect the two adjacent first touch control sub-electrodes;

each of the plurality of second touch control electrodes comprises a plurality of second touch control sub-electrodes and at least one second connecting electrode; the plurality of second touch control sub-electrodes are arranged in the first direction; each of the at least one second connecting electrode is located between two adjacent second touch control sub-electrodes in the first direction, to electrically connect the two adjacent second touch control sub-electrodes;

the plurality of second touch control sub-electrodes and the at least one second connecting electrode are located in different conductive layers relative to the base substrate, respectively;

each of the at least one second connecting electrode comprises at least one connecting sub-electrode, and two ends of each of the at least one connecting sub-electrode are connected to the two adjacent second touch control sub-electrodes, respectively;

an orthographic projection of each of the at least one connecting sub-electrode on the base substrate overlaps an orthographic projection of one of the plurality of first touch control sub-electrodes on the base substrate;

each of the at least one connecting sub-electrode comprises at least one first fold line portion and at least one second fold line portion;

a fold line shape of the first fold line portion is an approximate V shape, and a fold line shape of the second fold line portion is an approximate V shape; and an opening of the fold line shape of the first fold line portion and an opening of the fold line shape of the second fold line portion are faced to each other along the second direction, wherein each of the at least one connecting sub-electrode comprises a first contact portion, a second contact portion, and a plurality of connecting portions;

the first contact portion and the second contact portion serve as two ends of the connecting sub-electrode, respectively, and are connected to the two adjacent second touch control sub-electrodes;

the plurality of connecting portions are located between the first contact portion and the second contact portion and arranged in the second direction, and two ends of each of the plurality of connecting portions are connected to the first contact portion and the second contact portion, respectively;

the plurality of connecting portions comprise a first connecting portion and a second connecting portion; and the first connecting portion comprises the first fold line portion, and the second connecting portion comprises the second fold line portion, wherein the first contact portion, the second contact portion, and the plurality of connecting portions of each of the at least one connecting sub-electrode are disposed in a same layer, one end of the first connecting portion and one end of the second connecting portion are connected together by the first contact portion, and an other end of the first connecting portion and an other end of the second connecting portion are connected together by the second contact portion.

2. The touch control substrate according to claim 1, wherein the first fold line portion and the second fold line portion are arranged in the second direction; and a vertex of the fold line shape of the first fold line portion and a vertex of the fold line shape of the second fold line portion are located roughly in a first straight line extending in the second direction.

3. The touch control substrate according to claim 2, wherein the opening of the fold line shape of the first fold line portion and the opening of the fold line shape of the second fold line portion are axially symmetrical roughly about a second straight line extending in the first direction.

4. The touch control substrate according to claim 1, wherein each of the at least one connecting sub-electrode comprises a plurality of first fold line portions and a plurality of second fold line portions;

the plurality of first fold line portions are arranged in sequence in the first direction and connected in sequence to form the first connecting portion; and the plurality of second fold line portions are arranged in sequence in the first direction and connected in sequence to form the second connecting portion.

5. The touch control substrate according to claim 4, wherein the vertices of the plurality of first fold line portions are located roughly in a third straight line extending in the first direction; and the vertices of the plurality of second fold line portions are located roughly in a fourth straight line extending in the first direction.

6. The touch control substrate according to claim 1, wherein a center of the first contact portion and a center of the second contact portion are located roughly in a fifth straight line extending in the first direction.

7. The touch control substrate according to claim 1, wherein the first contact portion comprises a plurality of first sub-contact portions, and the plurality of first sub-contact portions are spaced apart from one another; the first connecting portion and the second connecting portion are connected to different first sub-contact portions in the first contact portion, respectively, so that the plurality of first sub-contact portions are electrically connected to each other by means of the first connecting portion and the second connecting portion;

the second contact portion comprises a plurality of second sub-contact portions and the plurality of second sub-contact portions are spaced apart from one another; and the first connecting portion and the second connecting portion are connected to different second sub-contact portions in the second contact portion, respectively, so that the plurality of second sub-contact portions are electrically connected to each other by means of the first connecting portion and the second connecting portion.

8. The touch control substrate according to claim 7, wherein the first connecting portion and the second connecting portion are axially symmetrical roughly about a second straight line extending in the first direction; and
centers of the plurality of first sub-contact portions and centers of the plurality of second sub-contact portions are located roughly in the second straight line.

9. The touch control substrate according to claim 1, wherein the touch control substrate comprises a first conductive layer, an insulating layer and a second conductive layer located on the base substrate;
the insulating layer is located between the first conductive layer and the second conductive layer; the first conductive layer and the second conductive layer are spaced apart and insulated from each other by the insulating layer in a direction perpendicular to the base substrate;
the second touch control sub-electrode is located in the first conductive layer, the second connecting electrode is located in the second conductive layer;
the first contact portion in the second connecting electrode is connected to the second touch control sub-electrode by means of at least one first through hole penetrating at least through the insulating layer; and the second contact portion in the second connecting electrode is connected to the second touch control sub-electrode by means of at least one second through hole penetrating at least through the insulating layer.

10. The touch control substrate according to claim 9, wherein the first contact portion and the second touch control sub-electrode overlap at least partially in the direction perpendicular to the base substrate, to form the at least one first through hole; and
the second contact portion and the second touch control sub-electrode overlap at least partially in the direction perpendicular to the base substrate, to form the at least one second through hole.

11. The touch control substrate according to claim 1, wherein the first touch control electrode and the second touch control electrode comprise a grid structure formed by a plurality of metal grids.

12. The touch control substrate according to claim 11, wherein a region defined by orthographic projection of the at least one connecting sub-electrode of the second connecting electrode on the base substrate overlaps at least partially a region defined by an orthographic projection of the first touch control electrode on the base substrate; and
the grid structure of the first touch control electrode comprises at least one metal grid located in the overlapping region.

13. The touch control substrate according to claim 1, wherein the first fold line portion of the connecting sub-electrode and the first touch control electrode overlap each other at at least one first position in the direction perpendicular to the base substrate; and
the second fold line portion of the connecting sub-electrode and the first touch control electrode overlap each other at at least one second position in the direction perpendicular to the base substrate.

14. The touch control substrate according to claim 13, wherein the first fold line portion comprises a first line segment portion and a second line segment portion; one end of the first line segment portion and one end of the second line segment portion are connected to each other to form an approximate V-shaped fold line shape;
in the direction perpendicular to the base substrate, the first fold line portion of the connecting sub-electrode and the first touch control electrode overlap each other in a plurality of first positions, the plurality of first positions are located in the first line segment portion and/or the second line segment portion;
the second fold line portion comprises a third line segment portion and a fourth line segment portion; one end of the third line segment portion and one end of the fourth line segment portion are connected to each other to form the approximate V-shaped fold line shape; and
in the direction perpendicular to the base substrate, the second fold line portion of the connecting sub-electrode and the first touch control electrode overlap each other in a plurality of second positions, and the plurality of second positions are located in the third line segment portion and/or the fourth line segment portion.

15. The touch control substrate according to claim 1, wherein the second connecting electrode comprises a plurality of connecting sub-electrodes, and plurality of connecting sub-electrodes are arranged in the second direction; and
the plurality of connecting sub-electrodes are connected to the second touch control sub-electrode at different positions of the second touch control sub-electrode, respectively.

16. The touch control substrate according to claim 1, wherein the first touch control electrode and the second touch control electrode are insulated from each other;
the first touch control electrode is a touch driving electrode, and the second touch control electrode is a touch sensing electrode; or
the first touch control electrode is a touch sensing electrode, and the second touch control electrode is a touch driving electrode.

17. A display panel, comprising a display member and the touch control substrate of claim 1, wherein the display member is stacked with the touch control substrate.

18. The display panel according to claim 17, further comprising an encapsulation layer, wherein the encapsulation layer is located between the display member and the touch control substrate.

19. An electronic device, comprising the display panel of claim 17.

* * * * *